(12) United States Patent
Takai

(10) Patent No.: US 11,634,099 B2
(45) Date of Patent: Apr. 25, 2023

(54) AIRBAG COVER

(71) Applicant: TOYODA GOSEI CO., LTD., Kiyosu (JP)

(72) Inventor: Hiroki Takai, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 17/859,091

(22) Filed: Jul. 7, 2022

(65) Prior Publication Data

US 2023/0010563 A1 Jan. 12, 2023

(30) Foreign Application Priority Data

Jul. 12, 2021 (JP) .............................. JP2021-115334

(51) Int. Cl.
*B60R 21/2165* (2011.01)
*B60R 21/205* (2011.01)
*B60R 21/215* (2011.01)

(52) U.S. Cl.
CPC ........ *B60R 21/2165* (2013.01); *B60R 21/205* (2013.01); *B60R 21/215* (2013.01)

(58) Field of Classification Search
CPC .......................... B60R 21/2165; B60R 21/205
See application file for complete search history.

(56) References Cited

U.S. PATENT DOCUMENTS

| 10,919,479 | B2 * | 2/2021 | Dorn ...................... B23K 26/53 |
| 2002/0125689 | A1 * | 9/2002 | Pinsenschaum .... B60R 21/2165 |
| | | | 280/728.2 |

| 2004/0056455 | A1 | 3/2004 | Nishijima et al. |
| 2006/0249931 | A1 | 11/2006 | Nishijima et al. |
| 2007/0205586 | A1 | 9/2007 | Nishijima et al. |
| 2008/0203708 | A1 | 8/2008 | Okumura et al. |

FOREIGN PATENT DOCUMENTS

| AT | 507276 A1 * | 3/2010 | ......... B60R 21/2165 |
| CN | 105644488 A * | 6/2016 | ......... B60R 21/2165 |
| CN | 111391777 A * | 7/2020 | ........... B60R 21/205 |
| CN | 112543715 A * | 3/2021 | ........... B60R 21/205 |
| DE | 102009048893 A1 * | 4/2011 | ......... B60R 21/2165 |
| DE | 102014117692 A1 * | 6/2016 | ......... B60R 21/2165 |
| JP | 2004025821 A * | 1/2004 | |
| JP | 2004-114738 A | 4/2004 | |
| JP | 2004-352179 A | 12/2004 | |
| JP | 2006-239765 A | 9/2006 | |
| JP | 2007-185797 A | 7/2007 | |
| JP | 2017-210230 A | 11/2017 | |
| WO | WO-2015004977 A1 * | 1/2015 | ......... B29C 65/0618 |
| WO | WO-2021213461 A1 * | 10/2021 | ........... B60R 21/205 |

* cited by examiner

*Primary Examiner* — Nicole T Verley

(74) *Attorney, Agent, or Firm* — Posz Law Group, PLC

(57) ABSTRACT

A breakable portion breaks, as a break start point portion, a portion in a vicinity of a center of a tip end side of a door portion away from a hinge portion on a rotation center side of the door portion when the door portion is opened. A breakable coupling portion in an area of the start point portion is disposed such that a width dimension between the breakable openings which are adjacent to each other in a plan view on a tip end portion away from the hinge portion is smaller than a width dimension on a base portion close to the hinge portion of the door portion.

6 Claims, 16 Drawing Sheets

AIRBAG COVER

CROSS-REFERENCE TO RELATED APPLICATIONS

This application is based on and claims priority under 35 USC 119 from Japanese Patent Application No. 2021-115334 filed on Jul. 12, 2021.

TECHNICAL FIELD

The present disclosure relates to an airbag cover, which is used in an airbag device including an airbag which inflates so as to protect an occupant or the like, covers a folded airbag, and forms a protruding opening to protrude the airbag when the airbag is inflated.

BACKGROUND ART

In the related art, an airbag cover disposed in an instrument panel of a vehicle includes a base material made of a synthetic resin such as polypropylene and a skin layer bonded to a front surface side of the base material, and the airbag cover is configured to cover an upper side of a folded airbag. When the airbag is inflated, a door portion provided on the base material is pushed by the inflated airbag to break a breakable portion around the door portion and to break a portion of the skin layer on a peripheral edge of the door portion, and the door portion opens to form a protruding opening of the airbag (for example, see JP-A-2017-210230). A back surface of the door portion is coupled to a door holding portion extending from a case side housing the folded airbag, and the door portion is held by the door holding portion to be openable.

In addition, as the airbag cover, there is an airbag cover in which a plurality of holes penetrating the front and back are disposed in a skin layer along a breaking line such that a door portion to which the skin layer is bonded is smoothly opened. Then, in order to make the holes provided in the skin layer inconspicuous, the holes are closed by a protrusion portion protruding from a base material at the time of molding the base material (for example, see JP-A-2004-114738). Alternatively, in order to easily break a skin layer at the time of inflation of an airbag, a protrusion protruding toward the skin layer side is provided on a base material, and the protrusion is pressed against the skin layer like a cutter at the time of opening a door portion to easily break the skin layer (for example, see JP-A-2004-352179).

However, in an airbag cover in the related art, in a configuration in which the holes are provided in the skin layer or the protrusion protruding from the base material is disposed on a back surface side of the skin layer in order to easily break the skin layer described in JP-A-2004-114738 and JP-A-2004-352179, compared to the airbag cover described in JP-A-2017-210230, the skin layer to be bonded to the front surface side of the base material can be accurately broken to smoothly form a protruding opening from which the airbag can protrude, but there is a concern that the influence of the holes or the protrusion on the front surface side of the skin layer deteriorates the design property of the skin layer.

SUMMARY

The present disclosure has been made to solve the above problems, and an object of the present disclosure is to provide an airbag cover in which a skin layer to be bonded to a front surface side of a base material can be accurately broken while preventing a decrease in the design property, and a protruding opening, from which the airbag can protrude, can be smoothly formed.

According to an aspect of the present disclosure, an airbag cover configured to cover an upper side of an airbag which is folded includes: a base material; and a skin layer bonded to a front surface side of the base material. When the airbag is inflated, a door portion provided on the base material is pushed by the airbag, which is inflated, to break a breakable portion around the door portion and to break a portion of the skin layer on a peripheral edge of the door portion, and the door portion opens to form a protruding opening of the airbag. A back surface side of the door portion is coupled to a door holding portion extending from a case side housing the airbag which is folded, and the door portion is held by the door holding portion to be openable. The breakable portion of the base material includes: a plurality of breakable openings which are strip-shaped, penetrate the front and back of the base material, and are disposed along an edge of the door portion; and a plurality of breakable coupling portions which are disposed to close gaps between the breakable openings and are broken when the airbag is inflated. The breakable portion breaks, as a break start point portion, a portion in a vicinity of a center of a tip end side of the door portion away from a hinge portion on a rotation center side of the door portion when the door portion is opened. The breakable coupling portion in an area of the start point portion is disposed such that a width dimension between the breakable openings which are adjacent to each other in a plan view on a tip end portion away from the hinge portion is smaller than a width dimension on a base portion close to the hinge portion of the door portion.

In the airbag cover according to the present disclosure, when the airbag is inflated, the door portion is pushed by the airbag which is inflated to break the breakable coupling portion at the break start point portion of the breakable portion. The breakable coupling portion to be broken is broken due to stress concentration on the side having a narrow width dimension. At this time, the breakable coupling portion breaks the tip end portion side having a narrow width dimension away from the door portion while leaving the base portion side having a wide width dimension on the door portion side close to the hinge portion. Therefore, the tip end portion side having the narrow width dimension is brought into contact with the back surface side of the skin layer with the hinge portion as a rotation center in accordance with the opening of the door portion to push up the skin layer. That is, while the breakable coupling portion is coupled to the tip end edge of the door portion, the tip end portion side having the narrow width dimension bites into the skin layer like a knife protruding from the tip end edge of the door portion, and the skin layer can be smoothly broken. As a result, with the opening of the door portion of the base material, the skin layer is rapidly broken from the tip end edge side of the door portion. Further, the breakage is propagated to the peripheral edge of the door portion, and the protruding opening of the airbag is smoothly formed together with the door portion. Then, since a protrusion or the like is not provided on the skin layer, the door portion does not affect the design property of the front surface side of the skin layer. Further, since the door portion is held by the door holding portion on the case side of the airbag device to be openable, the door portion can be smoothly opened without scattering when the airbag is inflated, and the protruding opening of the airbag can be formed. Similarly, since the skin layer is also bonded to and disposed on the base material, the protruding opening of the airbag can be smoothly formed without scattering at the time of inflation of the airbag by merely breaking the skin layer.

Therefore, in the airbag cover according to the present disclosure, it is possible to smoothly form the protruding opening, from which the airbag can protrude, by accurately breaking the skin layer bonded to the front surface side of the base material while preventing a decrease in the design property.

In the airbag cover according to an aspect of the present disclosure, it is desirable that the breakable coupling portion in the area of the start point portion couples an edge on the tip end portion side, in which a width dimension of at least one of both edges in a width direction is reduced, to an edge on the breakable openings side, which is coupled, in an acute angle shape in the plan view.

In such a configuration, when the breakable coupling portion of the start point portion is coupled to the edge of the adjacent breakable opening in an acute angle shape on the tip end portion side where the width dimension is narrowed, stress concentration smoothly occurs in the portion when a tensile force accompanying the inflation of the airbag is received, and the portion is easily broken. In addition, the end edge on the breakable opening side extending from the broken tip end portion is in a state of being coupled to the edge on the breakable opening side in an acute angle shape before breaking. Therefore, at the time of breaking, with the pushing-up of the tip end portion of the breakable coupling portion, the end edge enters the back surface side of the skin layer in a pushing and cutting manner so as to be continuous from an edge angle on a broken end surface side of the tip end portion, the breakage from the breakable portion due to the pushing-up of the tip end portion is easily propagated, and the skin layer can be smoothly broken from the break start point portion along the breakable portion.

In this case, as long as the breakable coupling portion in the area of the start point portion respectively couples the edges on the tip end portion side, in which a width dimension at both the edges in the width direction is reduced, to the edge on the breakable opening side, which is coupled, in an acute angle shape in a plan view, stress concentration occurs more smoothly on both the edges on the tip end portion side where the width dimension of the breakable coupling portion is narrowed, and the breakable coupling portion of the start point portion is easily broken. As a matter of course, with the pushing-up of the tip end portion of the breakable coupling portion, the end edges on the breakable opening side on both sides extending from the broken tip end portion enter the back surface side of the skin layer in a pushing and cutting manner so as to be continuous from the edge angle on the broken end surface side of the tip end portion, and therefore, the skin layer can be broken from the break start point portion along the breakable portion more smoothly.

In the airbag cover according to the present disclosure, it is desirable that the door portion has a substantially quadrangular plate shape, and a tip end edge on a tip end side at the time of opening, a hinge portion on a rotation center side at the time of opening, and two side edges between both ends of the tip end edge and both ends of the hinge portion are disposed around the door portion. The breakable portion is disposed on the tip end edge side and the two side edge sides. A recessed groove recessed from a back surface side to a front surface side of the base material is disposed in the hinge portion. The breakable opening of the breakable portion and the recessed groove of the hinge portion are shaped at the same time when the base material is molded.

In such a configuration, when the base material of the airbag cover is formed by molding, the breakable opening of the breakable portion and the recessed groove of the hinge portion are formed at the same time, and thus the base material can be easily formed. In addition, even if a coupling portion between the edge on the tip end portion side, where the width dimension of the breakable coupling portion is narrow, and the corresponding edge of the breakable opening is formed in an acute angle shape, the base material can be easily formed as compared with cutting work of an end mill or the like as long as the forming is performed by molding.

In the airbag cover according to the present disclosure, a second door portion, which is opened at the time of inflation, may be symmetrically disposed including the side edges and the hinge portion, with the breakable portion on the tip end edge side of the door portion interposed therebetween and the breakable portion on the tip end edge side being shared.

That is, in such a configuration, the door portion having a double door type can be disposed in the airbag cover.

In this case, the second door portion can be disposed on a rear side of the door portion and is disposed on an instrument panel in front of a front seat of a vehicle.

In such a configuration, the airbag cover disposed on the instrument panel is formed by disposing the door portion (first door portion) on the front side and the second door portion on the rear side. Then, when the first door portion and the second door portion are opened with the inflation of the airbag, on the tip end edge side of the first door portion, the breakable coupling portions break the side having the narrow width dimensions, that is, in a state where the breakable coupling portions are coupled to the first door portion side and the breakable coupling portions are not coupled to the second door portion side, the first door portion and the second door portion are opened, and the second door portion on the rear side close to the occupant is opened in a state where the breakable coupling portions are not coupled to the tip end edge side at the time of opening. Therefore, even if the second door portion comes into contact with the occupant when the second door portion is opened, the tip end edge side with less unevenness can be brought into contact with the occupant.

DESCRIPTION OF EMBODIMENTS

Figure 1:
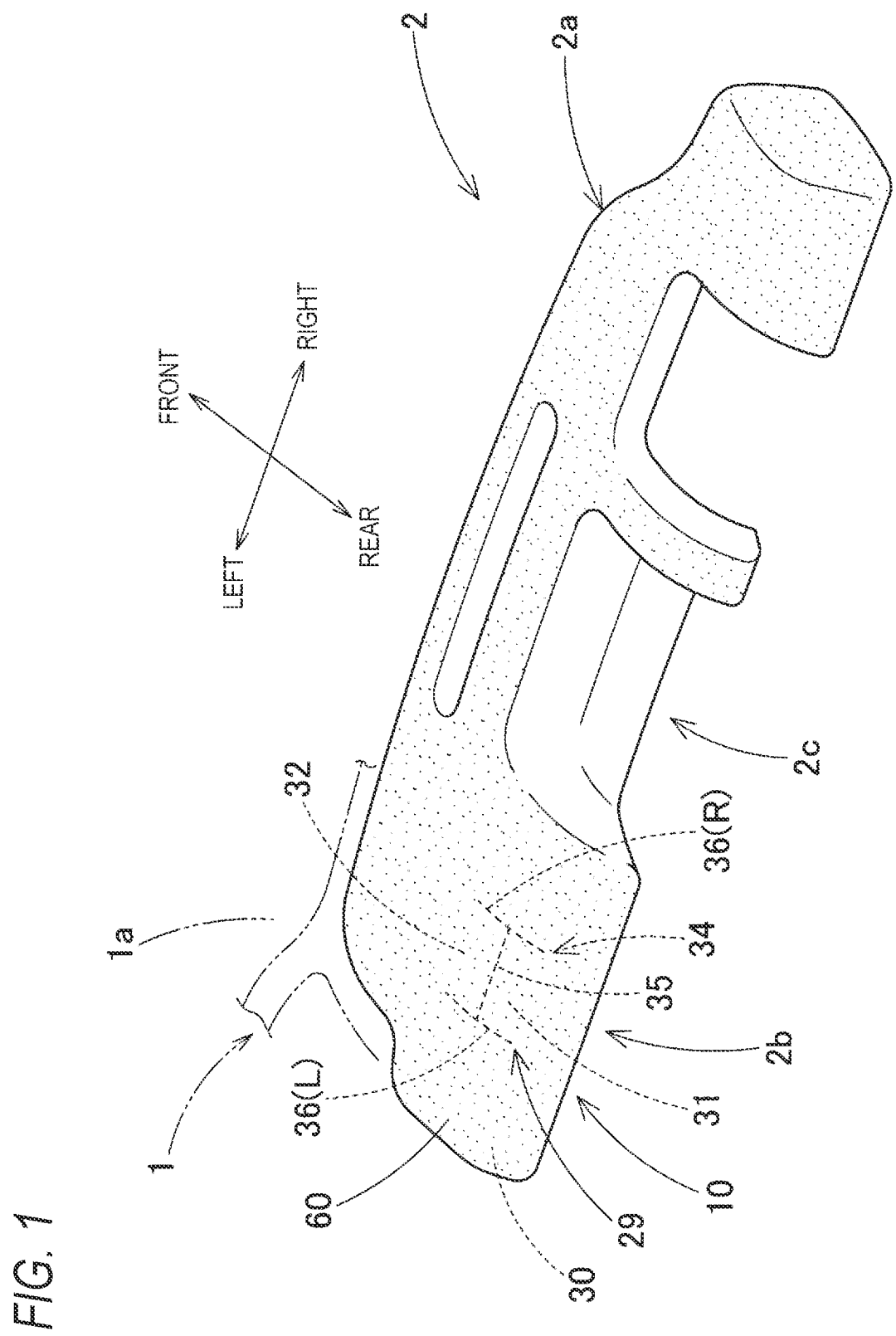
FIG. 1 is a schematic perspective view of an airbag device using an airbag cover according to an embodiment of the present disclosure.
Figure 2:
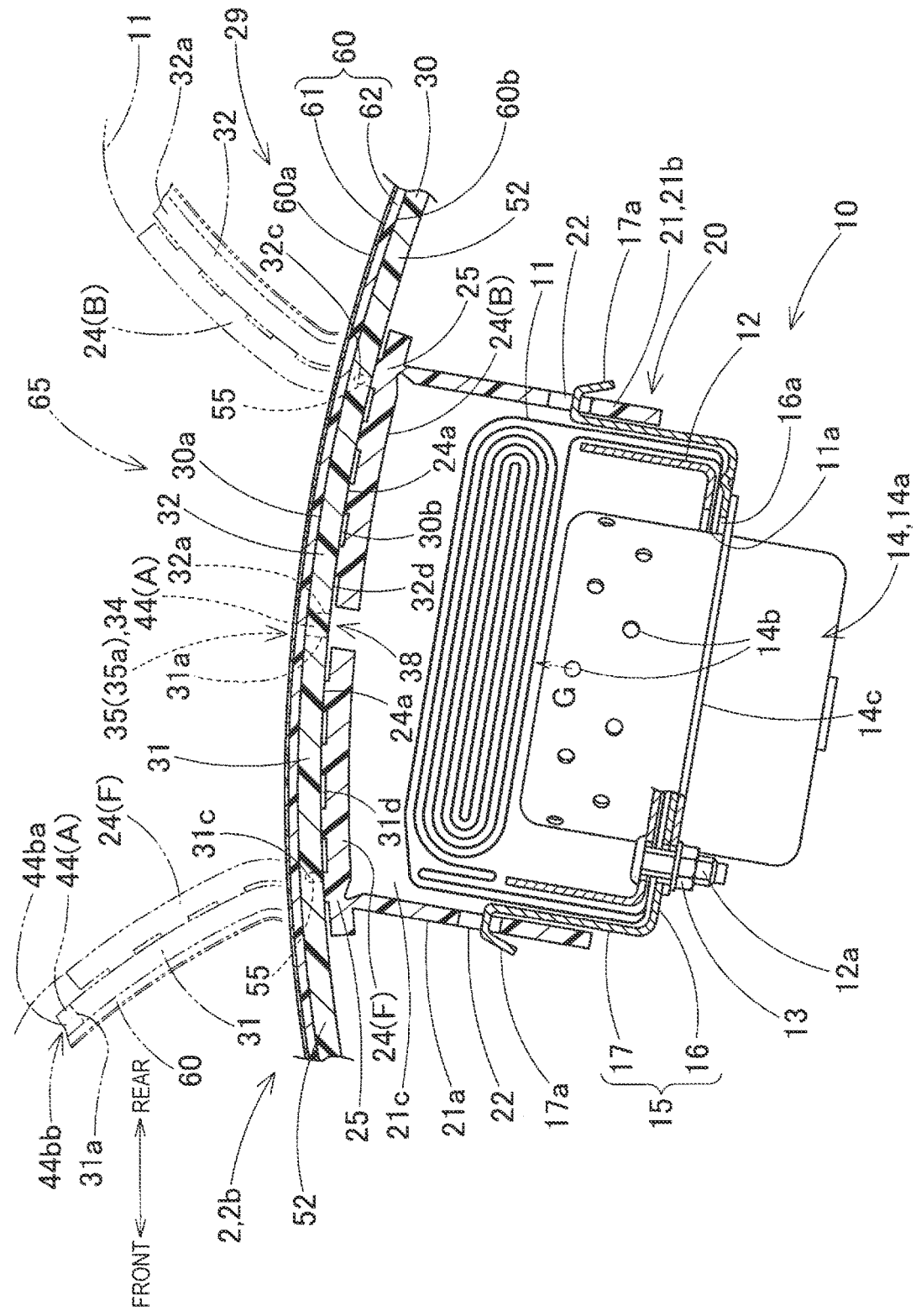
FIG. 2 is a schematic longitudinal cross-sectional view of the airbag device according to the embodiment.
Figure 3:
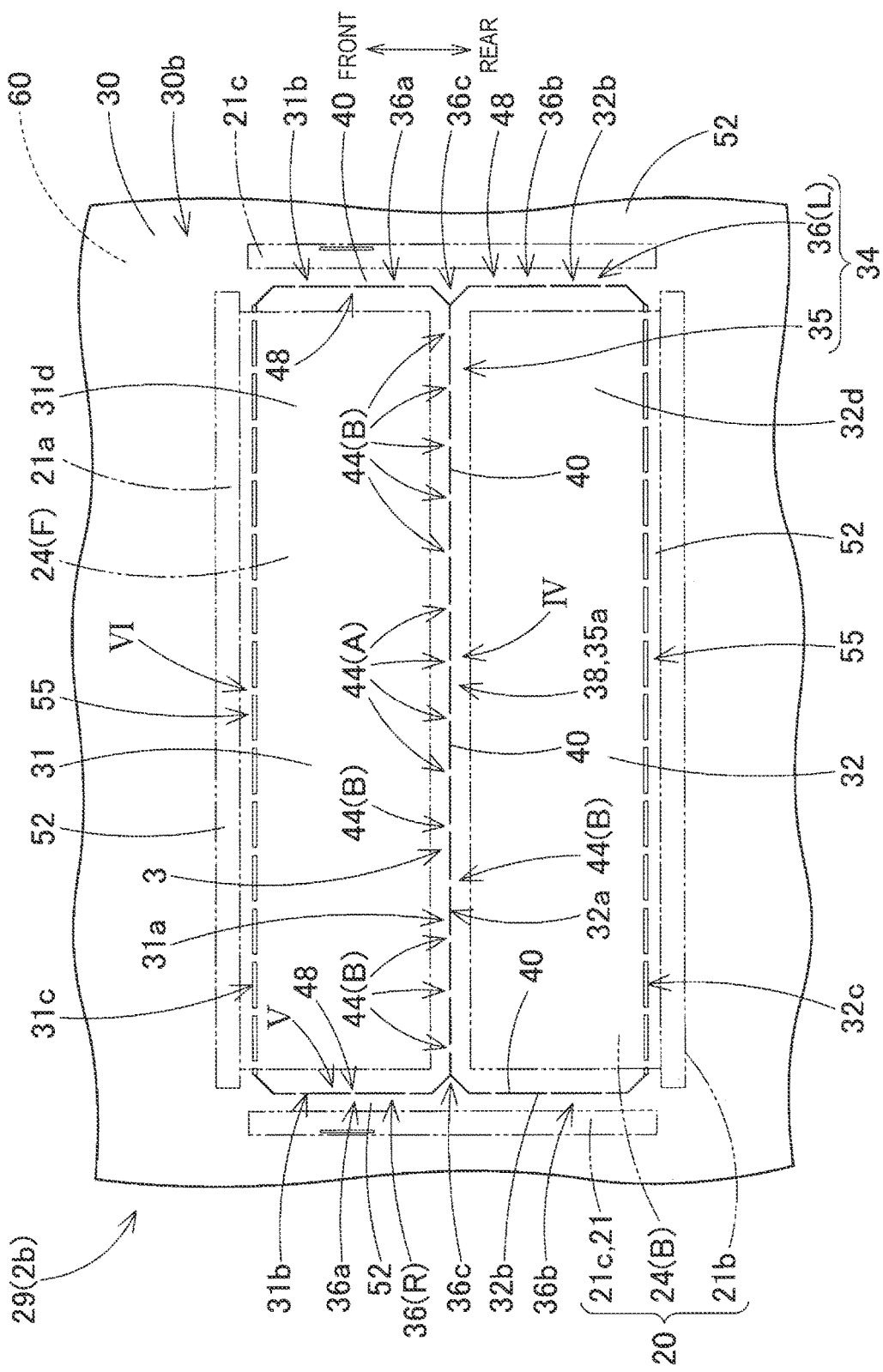
FIG. 3 is a bottom view of the vicinity of a door portion in a base material of the airbag cover according to the embodiment.

An embodiment of the present disclosure will be described with reference to the drawings. As illustrated in FIGS. 1 and 2, an airbag cover 29 according to the embodiment is disposed in an instrument panel 2 of a vehicle 1 and is used in an airbag device 10 for a front passenger seat. The instrument panel 2 is disposed below a front windshield 1a on a front side of a front seat of the vehicle 1, and includes a driver seat side portion 2a on a front side of a driver seat, a front passenger seat side portion 2b in front of the front passenger seat, and a center portion 2c on a front side of a center console (not illustrated). A portion of the front passenger seat side portion 2b is configured as a portion of the airbag cover 29 which forms a protruding opening 65 such that an airbag 11 smoothly protrudes when the airbag 11 (see FIG. 2) is inflated.

As illustrated in FIG. 2, the airbag device 10 includes: the airbag 11 which protrudes from a case 15 serving as a housing portion through the protruding opening 65 while being inflated such that an inflation gas G is caused to flow into the airbag 11 to protect a passenger on the front passenger seat; an inflator 14 which supplies the inflation gas G to the airbag 11; the airbag cover 29 which covers the folded and housed airbag 11; the case 15 which houses and holds the airbag 11 and the inflator 14; and a coupling member 20 which couples door portions 31, 32 (to be described later) on the airbag cover 29 side and the case 15 side. The case 15 is coupled to a body side of the vehicle 1 by a bracket (not illustrated). The vicinity of an outer peripheral edge or the like of the instrument panel 2 including the airbag cover 29 is held on the body side of the vehicle 1, and the instrument panel 2 is coupled to a side wall portion 17 of the case 15 at a portion of the airbag cover 29 by using the coupling member 20.

The airbag 11 is formed of a woven fabric of polyester or the like, and an inflation completion shape of the airbag 11 is a substantially truncated quadrangular pyramid shape in which a receiving surface for receiving the passenger on the front passenger seat is provided at a rear end and the receiving surface is tapered toward a front portion side. The airbag 11 includes an inflow opening 11a, on a lower surface of a front end side, through which the inflation gas G flows into the airbag 11. The inflow opening 11a is opened in a circular shape. A peripheral edge of the inflow opening 11a is pressed by a substantially quadrangular annular retainer 12 disposed in the airbag 11, and is attached to a bottom wall portion 16 of the case 15. The retainer 12 has bolts 12a which extends downward and protrudes at four corners having a substantially quadrangular annular shape. Each of the bolts 12a penetrates the peripheral edge of the inflow opening 11a of the airbag 11, the bottom wall portion 16 (to be described later) of the case 15, and a flange portion 14c (to be described later) of the inflator 14. Each of the bolts 12a attaches and fixes the airbag 11 and the inflator 14 to the bottom wall portion 16 of the case 15 by fastening a nut 13.

The inflator 14 includes a main body portion 14a having a substantially cylindrical shape and provided with a gas discharge port 14b for discharging the inflation gas G at an upper portion thereof, and the flange portion 14c protruding from an outer peripheral surface of the main body portion 14a and allowing each bolt 12a of the retainer 12 to penetrate therethrough.

The case 15 is made of sheet metal and includes the bottom wall portion 16 having a substantially rectangular plate shape and the side wall portion 17 having a substantially quadrangular tube shape and extending upward from an outer peripheral edge of the bottom wall portion 16. An insertion hole 16a into which the main body portion 14a of the inflator 14 is inserted from below is opened in the bottom wall portion 16. A through hole (numeral reference is omitted) through which each bolt 12a of the retainer 12 passes is disposed in a peripheral edge of the insertion hole 16a. The peripheral edge of the inflow opening 11a of the airbag 11 and the flange portion 14c of the inflator 14 are attached and fixed to the bottom wall portion 16 of the case 15 by the bolts 12a of the retainer 12 and the nuts 13. The side wall portion 17 is formed with locking hooks 17a to be locked to locking holes 22 of a case side portion 21 (to be described later) of the coupling member 20. The locking hooks 17a are disposed at front and rear portions of the side wall portion 17, and a plurality of the locking hooks 17a are disposed side by side along a left-right direction.

The coupling member 20 is made of a synthetic resin such as an olefin-based thermoplastic resin, and includes the case side portion 21, which has a substantially quadrangular tube shape and is disposed so as to surround the side wall portion 17 of the case 15, and door holding portions 24(F, B) coupled to a back surface side of the airbag cover 29. In the case side portion 21, the locking holes 22 into which the locking hooks 17a of the case 15 are inserted are formed in a front wall portion 21a and a rear wall portion 21b. The door holding portions 24(F, B) are welded to back surfaces 31d, 32d sides of the door portions 31, 32 of the airbag cover 29 so as to be spaced apart from each other in a front-rear direction. A plurality of welded portions 24a of protrusions are formed on an upper surface side of each of the door holding portions 24. By using the welded portions 24a, the door holding portions 24 are welded to the back surfaces 31d, 32d sides of the door portions 31, 32 by vibration welding. In addition, in the vicinity of the front wall portion 21a and the rear wall portion 21b of the case side portion 21 in the door holding portions 24(F, B), a thin hinge portion 25 is disposed such that the door holding portions 24 easily bend and open in a state where the door holding portions 24 hold the door portions 31, 32.

As illustrated in FIGS. 1 to 6B, the airbag cover 29 includes a base material 30, and a skin layer 60 bonded to a front surface side of the base material 30 using an adhesive. The base material 30 is formed by molding (specifically, injection molding) from a synthetic resin such as polypropylene. The base material 30 and the skin layer 60 are disposed not only on the front passenger seat side portion 2b, which is a portion of the airbag cover 29, but also on the driver seat side portion 2a and the center portion 2c of the instrument panel 2 in the same manner. At the portion of the airbag cover 29 of the front passenger seat side portion 2b, the door holding portions 24(F, B) of the coupling member 20 are coupled to the base material 30.

The skin layer 60 includes a fabric 61 as a skin disposed on a front surface 60a side, and a sheet-like cushion layer 62 to which the fabric 61 is bonded. The fabric 61 is a woven fabric obtained by weaving yarns of polyester or the like using warps and wefts. The cushion layer 62 is formed of a cushion material made of polypropylene or the like.

Then, at a position of the base material 30 where the coupling member 20 is disposed, the opened door portions 31, 32 are disposed to cover the folded airbag 11 and to form the protruding opening 65 for protruding the airbag 11 toward the front passenger seat side by being pushed by the inflated airbag 11. The door portion 31 is a first door portion disposed on the front side, and the door portion 32 is a second door portion disposed on the rear side.

The door portions 31, 32 are configured to be opened to form the protruding opening 65 of the airbag 11 by breaking a breakable portion 34 around the door portions 31, 32 and further breaking a portion of the skin layer 60 at the peripheral edge of the door portions 31, 32. As a matter of course, each of the door portions 31, 32 is configured to couple the door holding portions 24(F, B) of the coupling member 20 to the back surfaces 31d, 32d sides, and to be opened to form the protruding opening 65 together with the door holding portions 24(F, B).

The breakable portion 34 includes: a plurality of strip-shaped breakable openings 40 penetrating the front and back of the base material 30 and disposed along the edges of the door portions 31, 32; and a plurality of breakable coupling portions 44, 48 disposed to close gaps between the breakable openings 40 and broken when the airbag 11 is inflated. Then, the breakable portion 34 is configured to break, as a break start point portion 38, a portion in the vicinity of centers on tip end edges 31a, 32a sides of the door portions 31, 32 away from hinge portions 31c, 32c on a rotation center side of the door portions 31, 32 when the door portions 31, 32 are opened.

In the case of the embodiment, each of the first door portion 31 and the second door portion 32 is formed in a substantially rectangular plate shape extending in the left-right direction. The breakable portion 34 is formed in a substantially H shape when viewed from above by disposing a horizontal bar portion 35 extending in the left-right direction and left and right vertical bar portions 36(L, R) extending from both left and right ends of the horizontal bar portion 35 to both front and rear sides when viewed from above. Then, in a portion of the horizontal bar portion 35, the breakable coupling portion 44 is disposed to close the breakable opening 40 (see FIGS. 4A and 4B), and in portions of the vertical bar portions 36(L, R), the breakable coupling portion 48 is disposed to close the breakable opening 40 (see FIGS. 5A and 5B).

In the case of the embodiment, a center portion 35a of the horizontal bar portion 35 in the left-right direction is the break start point portion 38 shared by the tip end edges 31a, 32a sides of the first door portion 31 and the second door portion 32.

Figure 4A:
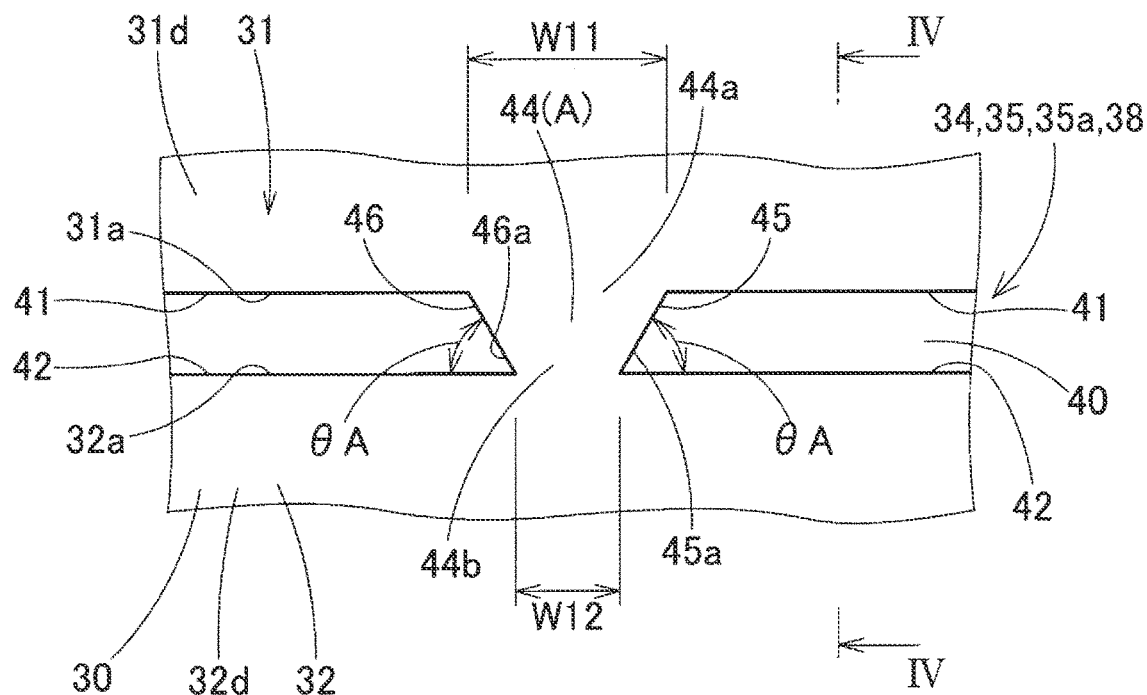
FIG. 4A is a schematic enlarged bottom view illustrating the vicinity of a break start point portion of a breakable portion in the base material according to the embodiment and corresponds to a portion IV in FIG. 3.
Figure 4B:
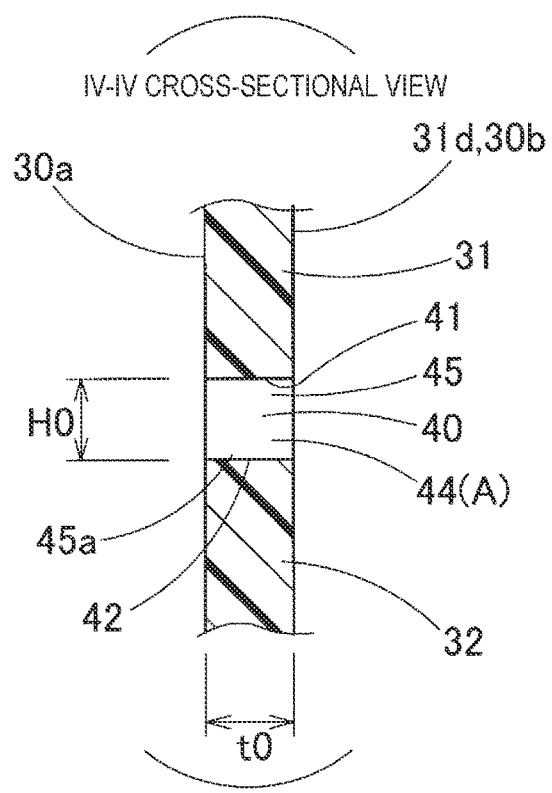
FIG. 4B illustrates a schematic cross-sectional view of the vicinity of the portion.
Figure 8:
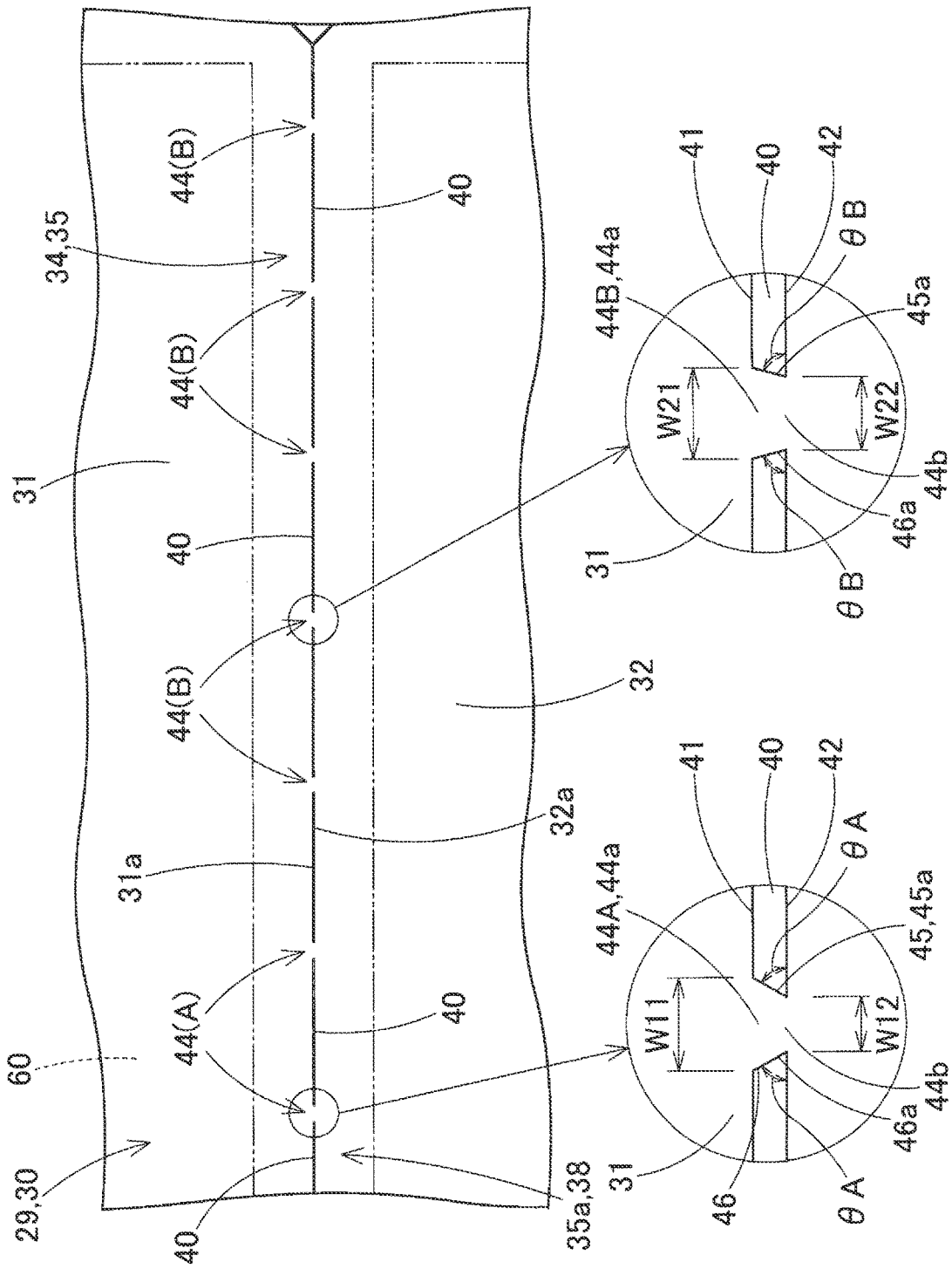
FIG. 8 is a schematic partial enlarged bottom view of a breakable portion on a tip end edge side in the door portion of the airbag cover according to the embodiment.

Breakable coupling portions 44(A, B) disposed in the horizontal bar portion 35 are disposed such that a width dimension between the adjacent breakable openings 40, 40 in a plan view on a tip end portion 44b side away from the hinge portion 31c is smaller than a width dimension on a base portion 44a side close to the hinge portion 31c of the door portion 31 (see FIGS. 4A, 4B, and 8). That is, when the first door portion 31 on the front side of the airbag cover 29 is used as a reference, a width dimension W11 of the base portion 44a on the hinge portion 31c side of the breakable coupling portion 44A in an area of the start point portion 38 is wider than a width dimension W12 of the tip end portion 44b away from the hinge portion 31c in a plan view.

In the case of the embodiment, fourteen breakable coupling portions 44 are disposed on the horizontal bar portion 35, four breakable coupling portions 44A are disposed in the area of the start point portion 38, and five breakable coupling portions 44B shifted from the start point portion 38 are disposed on each of the left and right sides.

In the breakable coupling portion 44A in the area of the start point portion 38, among intersection angles between side edges 45, 46, in a width direction (left-right direction) on the adjacent breakable openings 40, 40 sides, and facing edges 41, 42 facing each other in a front-rear direction of the breakable opening 40, an intersection angle θA on the tip end portion 44b side, which is the hinge portion 31c side, is an acute angle (about 60° in the case of the embodiment) (see FIGS. 4A and 4B).

In addition, as illustrated in FIG. 8, in the breakable coupling portion 44B on the vertical bar portions 36(L, R) sides deviated to the left and right from the center portion 35a in the left-right direction of the horizontal bar portion 35 of the breakable portion 34, among intersection angles between the side edges 45, 46, in the width direction (left-right direction) on the adjacent breakable openings 40, 40 sides, and the facing edges 41, 42 facing each other in the front-rear direction of the breakable opening 40, an intersection angle θB on the tip end portion 44b side, which is the hinge portion 31c side, is an acute angle (about 75° in the case of the embodiment), but is larger than that in the breakable coupling portion 44A.

A thickness dimension t0 of the base material 30 is about 3 mm, an opening width dimension H0 of the breakable opening 40 is about 1 mm, a width dimension W11 of the base portion 44a of the breakable coupling portion 44A is about 4.2 mm, a width dimension W12 of the tip end portion 44b is about 3 mm, a width dimension W21 of the base portion 44a of the breakable coupling portion 44A is about 4.54 mm, and a width dimension W22 of the tip end portion 44b is about 4 mm.

Figure 5A:
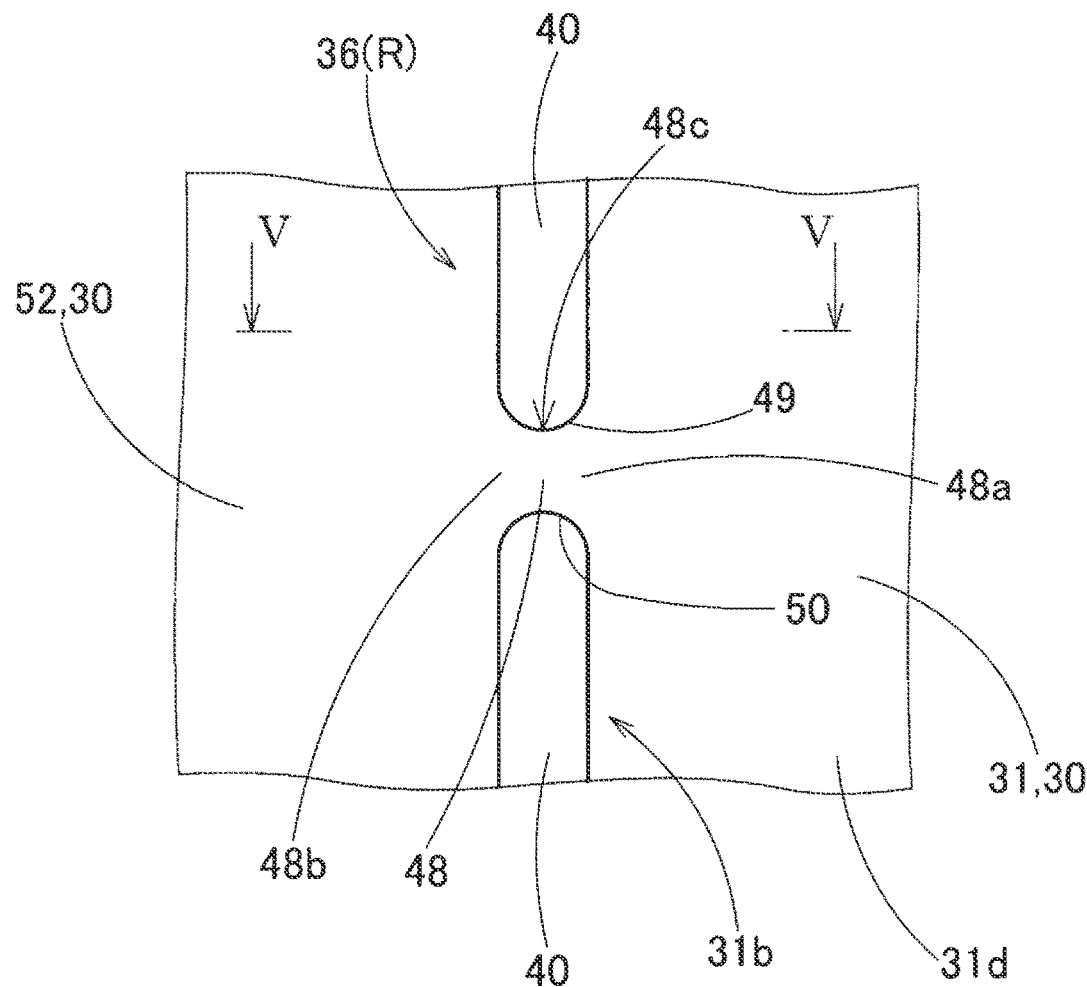
FIG. 5A is a schematic enlarged bottom view illustrating the vicinity of a side edge of the door portion in the base material according to the embodiment and corresponds to a portion V in FIG. 3.
Figure 5B:
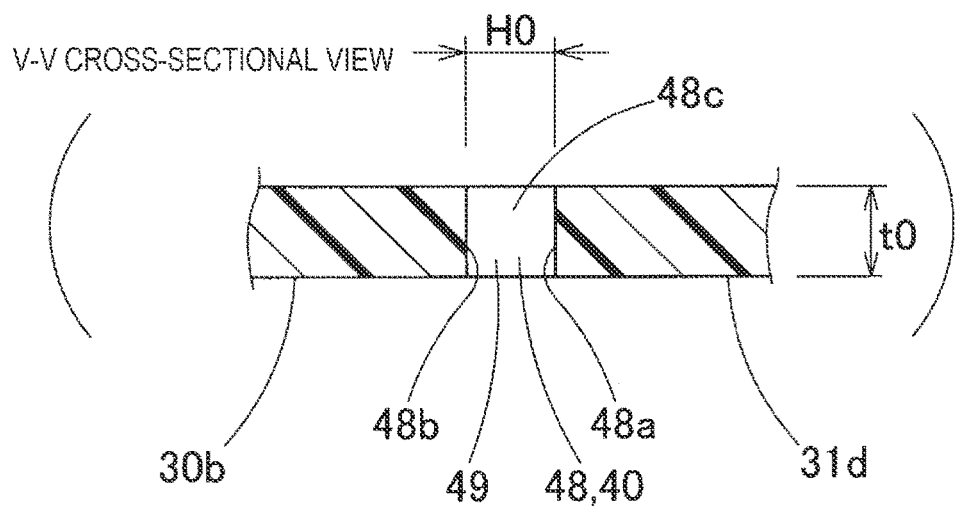
FIG. 5B illustrates a schematic cross-sectional view of the vicinity of the portion.
Figure 6A:
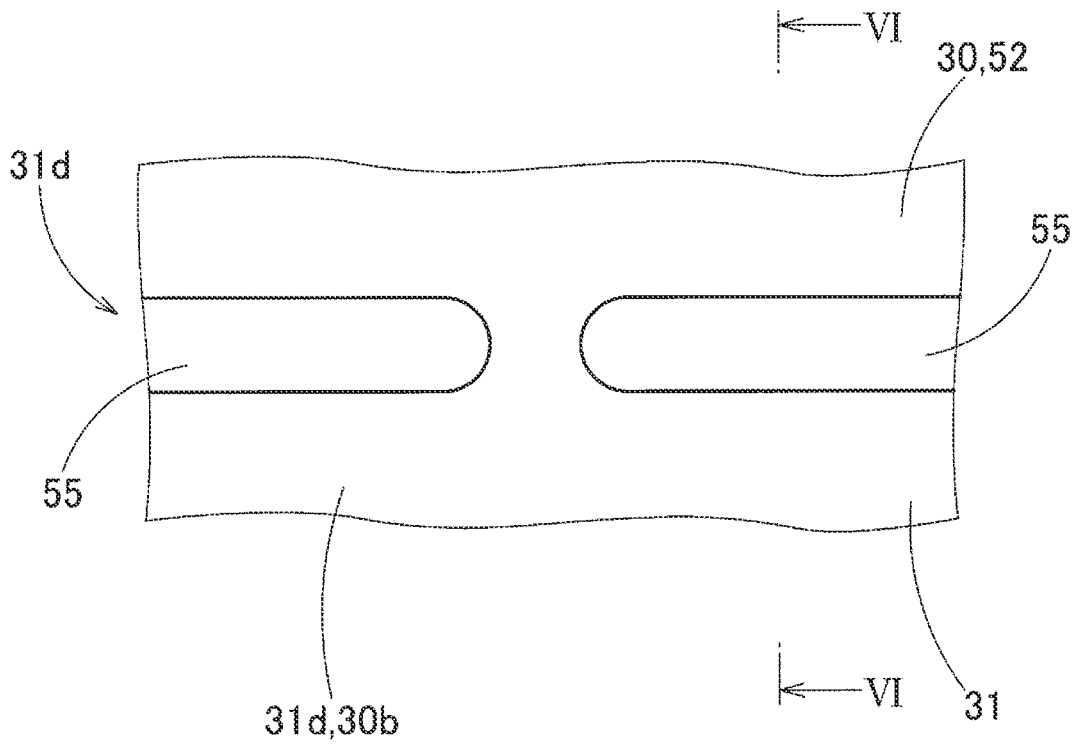
FIG. 6A is a schematic enlarged bottom view illustrating the vicinity of a hinge portion of the door portion in the base material according to the embodiment and corresponds to a portion VI in FIG. 3.
Figure 6B:
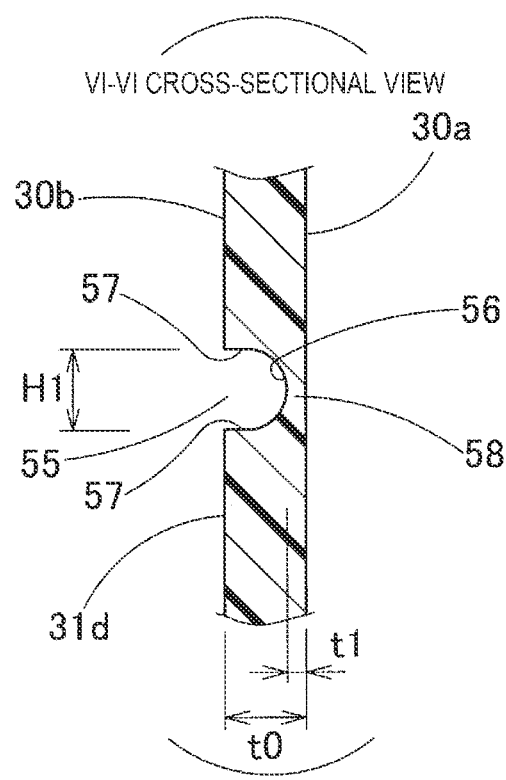
FIG. 6B illustrates a schematic cross-sectional view of the vicinity of the portion.

In addition, although the breakable coupling portions 48 disposed in the vertical bar portions 36(L, R) are disposed to close gaps between the adjacent breakable openings 40, the breakable coupling portions 48 are formed in a drum shape in a plan view, side edges 49, 50 on the breakable opening 40 side are formed in a semicircular arc shape, and a base portion 48a on the door portions 31, 32 sides and a tip end portion 48b on a non-door portion (general portion) 52 side around the door portions 31, 32 are formed in a symmetrical shape (see FIGS. 5A and 5B). When the breakable coupling portion 48 having the drum shape breaks due to the inflation of the airbag 11, the vicinity of an intermediate portion 48c between the base portion 48a and the tip end portion 48b having a narrow width dimension is broken.

The vertical bar portions 36(L, R) are formed such that a front portion 36a side is disposed on a side edge 31b side of the first door portion 31, a rear portion 36b side is disposed on a side edge 32b side of the second door portion 32, and at a center portion 36c in the front-rear direction, the breakable opening 40 extends from the breakable coupling portion 44 on the horizontal bar portion 35 side to both the front and rear sides in a Y-shaped bifurcated shape, and the breakable opening 40 extends in the front-rear direction with the breakable coupling portion 48 interposed therebetween.

The hinge portions 31c, 32c of the door portions 31, 32 are formed by intermittently providing recessed grooves 55 recessed from a back surface 30b side to a front surface 30a side of the base material 30 along the left-right direction. The recessed groove 55 is formed by providing side surfaces 57, 57 which expand from a bottom surface 56 having a substantially semicircular arc shape from each other in a cross section (see FIGS. 6A and 6B). Then, when the door portions 31, 32 are opened, the bottom wall portion 58 is bent or broken, and the door portions 31, 32 are rotated to form the protruding opening 65.

In the case of the embodiment, an opening width dimension H1 of the recessed groove 55 is about 1 mm, and a thickness dimension t1 of the bottom wall portion 58 is about 0.4 mm.

Figure 10:
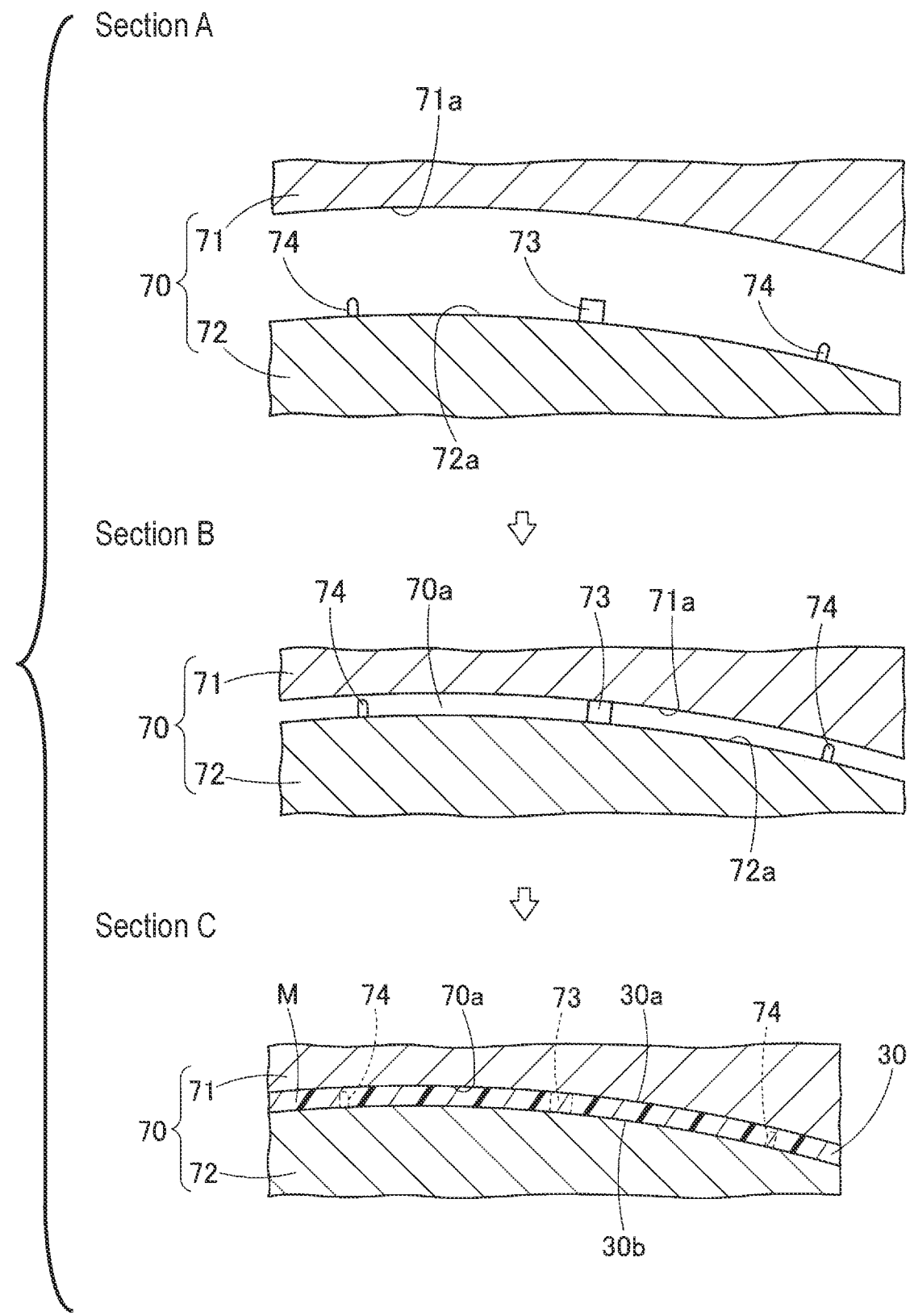
FIG. 10 is a view illustrating molding of the base material according to the embodiment.

Then, the breakable opening 40 of the breakable portion 34 of the base material 30 and the recessed grooves 55 of the hinge portions 31c, 32c are shaped at the same time when the base material 30 is molded. That is, as illustrated in sections A, B, and C of FIG. 10, the base material 30 is formed by using a molding die (specifically, a molding die for injection molding) 70 including split molds 71, 72. The split molds 71, 72 include mold surfaces 71a, 72a which can mold the front surface 30a side and the back surface 30b side of the base material 30, and a rib 73 which can form the breakable opening 40 and a rib 74 which can form the recessed grooves 55 of the hinge portions 31c, 32c are disposed on the mold surface 72a which molds the back surface 30b side. Therefore, the base material 30 can be manufactured by injecting a molding material M of the base material 30 into a cavity 70a when the split molds 71, 72 of the molding die 70 are closed, curing the molding material M, opening the mold, and releasing the mold. As a result, the breakable opening 40 of the breakable portion 34 of the base material 30 and the recessed grooves 55 of the hinge portions 31c, 32c are shaped by the ribs 73, 74 when the base material 30 is molded.

Then, the airbag cover 29 of the embodiment is formed by applying an adhesive to the base material 30, which is formed by molding, and pressure-bonding the skin layer 60. The skin layer 60 is formed by adsorbing the fabric 61 to the cushion layer 62, to which the adhesive is applied, by vacuum molding.

In the airbag cover 29 manufactured in this manner, the door holding portions 24(F, B) of the coupling member 20 are welded to the back surfaces 31d, 32d of the corresponding first door portion 31 and second door portion 32.

Then, in a state where the retainer 12 is housed in the airbag 11, the airbag 11 is folded, the folded airbag 11 is wrapped with a wrapping material (not illustrated), and the airbag 11 is housed in the case 15. At this time, each bolt 12a of the retainer 12 protrudes downward from the bottom wall portion 16 of the case 15. Then, the main body portion 14a of the inflator 14 is inserted into the insertion hole 16a of the case 15 from below, each bolt 12a of the retainer 12 penetrates the flange portion 14c of the inflator 14, and the nut 13 is fastened to each bolt 12a, whereby the folded airbag 11 and the inflator 14 can be attached and fixed to the case 15.

Thereafter, the instrument panel 2 is fixed to the body side of the vehicle 1, the locking hook 17a of the case 15 is inserted into and locked to the locking hole 22 of the case side portion 21 of the coupling member 20 welded to the airbag cover 29, a lead wire (not illustrated), which inputs an operation signal and extends from a predetermined control device, is coupled to the inflator 14, and the case 15 is attached and fixed to the body side of the vehicle 1 by using a predetermined bracket, whereby the airbag device 10 can be mounted on the vehicle 1.

In the airbag device 10 mounted on the vehicle 1 as described above, when the inflator 14 is operated to discharge the inflation gas G, the airbag 11 is inflated by causing the inflation gas G to flow into the airbag 11. Then, when the airbag 11 is inflated, the base material 30 breaks the breakable coupling portions 44, 48 of the breakable portion 34, the first door portion 31 and the second door portion 32 bend the hinge portions 31c, 32c, and are pushed and opened together with the door holding portions 24(F, B) of the coupling member 20 while breaking the skin layer 60 on the peripheral edge, so as to open the protruding opening 65, and the airbag 11 protrudes from the protruding opening 65.

Figure 7:
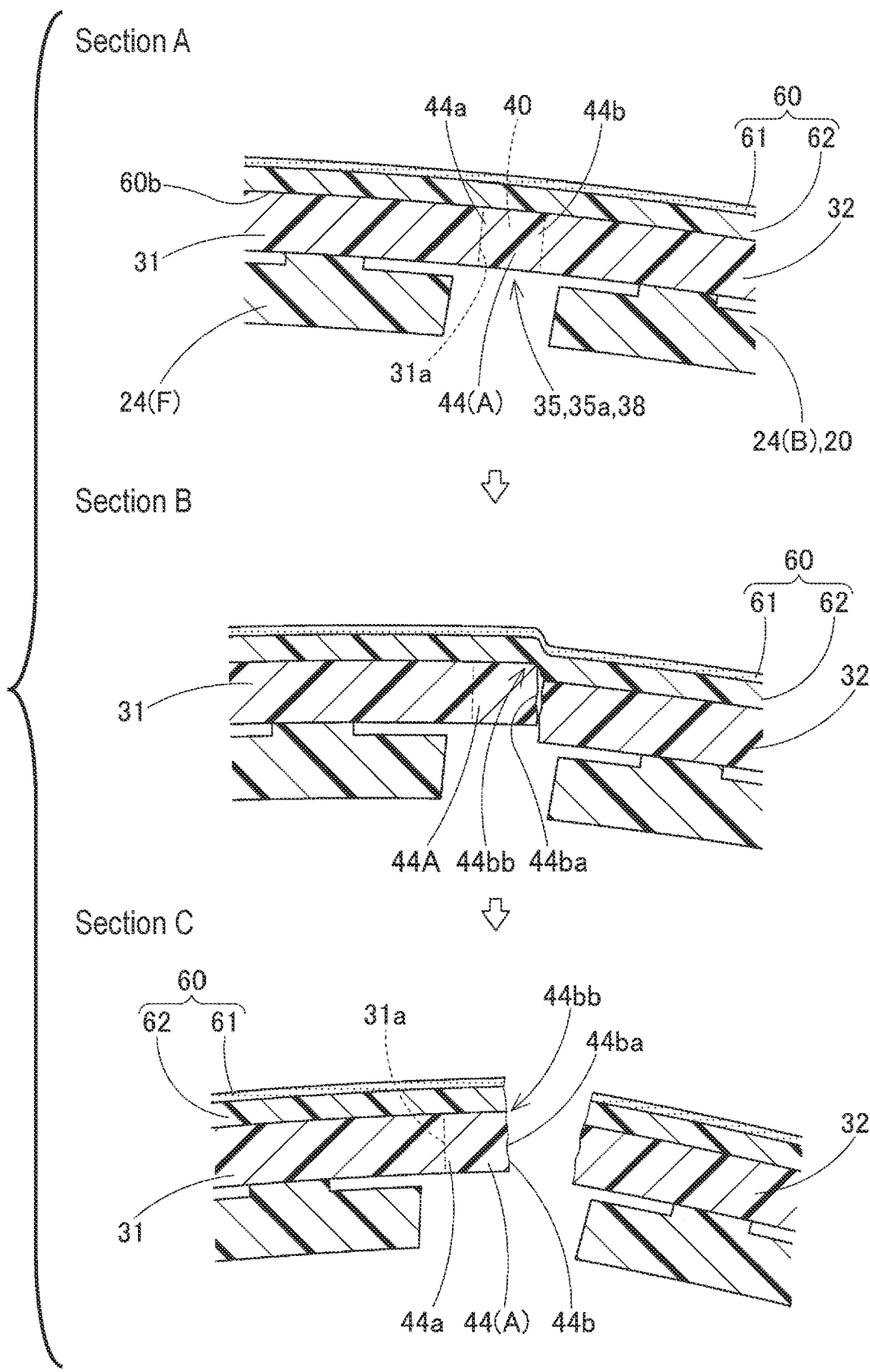
FIG. 7 is a schematic enlarged longitudinal cross-sectional view illustrating an initial stage of opening of the door portion in the airbag cover according to the embodiment.

Then, in the airbag cover 29 of the embodiment, when the airbag 11 is inflated, for example, in the door portion 31 on the front side, the door portion 31 is pushed by the inflated airbag 11 to break the breakable coupling portion 44A at the break start point portion 38 of the breakable portion 34. The breakable coupling portion 44A to be broken is broken due to stress concentration on the side having the narrow width dimension W12. At this time, the breakable coupling portion 44A breaks the tip end portion 44b side having the narrow width dimension W12 away from the door portion 31 while leaving the base portion 44a side having the wide width dimension W11 on the door portion 31 side close to the hinge portion 31c. Therefore, an edge angle 44bb of the front surface 30a of the base material 30 on a breaking surface 44ba on the tip end portion 44b side having the narrow width dimension W12 is brought into contact with a back surface 60b side of the skin layer 60 with the hinge portion 31c as a rotation center in accordance with the opening of the door portion 31 to push up the skin layer 60. That is, as illustrated in sections A, B, and C of FIG. 7, while the breakable coupling portion 44A is coupled to the tip end edge 31a of the door portion 31, the edge angle 44bb on the tip end portion 44b side having the narrow width dimension W12 bites into the skin layer 60 like a knife protruding from the tip end edge 31a of the door portion 31, and the skin layer 60 can be smoothly broken. As a result, with the opening of the door portion 31 of the base material 30, the skin layer 60 is rapidly broken from the tip end edge 31a side of the door portion 31. Further, the breakage is propagated to the peripheral edge of the door portion 31, and the protruding opening 65 of the airbag 11 is smoothly formed together with the door portion 31 (see a two-dot chain line in FIG. 2). Then, since a protrusion or the like is not provided on the skin layer 60, the door portion 31 does not affect the design property of the front surface 60a side of the skin layer 60. Further, since the door portion 31 is held by the door holding portion 24 on the case 15 side of the airbag device 10 to be openable, the door portion 31 can be smoothly opened without scattering when the airbag 11 is inflated, and the protruding opening 65 of the airbag 11 can be formed. Similarly, since the skin layer 60 is also bonded to and disposed on the base material 30, the protruding opening 65 of the airbag 11 can be smoothly formed without scattering at the time of inflation of the airbag 11 by merely breaking the skin layer 60. In the case of the embodiment, the entire area of the horizontal bar portion 35 is broken along with the breakage of the start point portion 38, and the vertical bar portions 36(L, R) are also broken by the propagation of the breakage, such that the door portion 32 also bends the hinge portion 32c and smoothly opens.

Therefore, in the airbag cover 29 of the embodiment, it is possible to smoothly form the protruding opening 65 from which the airbag 11 can protrude by accurately breaking the skin layer 60 bonded to the front surface 30a side of the base material 30 while preventing a decrease in the design property.

Then, in the airbag cover 29 of the embodiment, the breakable coupling portion 44A in the area of the start point portion 38 couples an end edge 45a on the tip end portion 44b, in which the width dimension W12 of at least one side edge 45 of both the edges 45, 46 in the width direction is reduced, to the edge 42 on the breakable opening 40 side, which is to be coupled, in an acute angle shape in a plan view.

Therefore, in the embodiment, when the breakable coupling portion 44A of the start point portion 38 is coupled to the edge 45 of the adjacent breakable opening in an acute angle shape on the tip end portion 44b side where the width dimension W12 is narrowed, stress concentration smoothly occurs in the portion when a tensile force accompanying the inflation of the airbag 11 is received, and the portion is easily broken. In addition, for example, the end edge 45a on the breakable opening 40 side extending from the broken tip end portion 44b is in a state of being coupled to the edge 42 on the breakable opening 40 side in an acute angle shape before breaking. Therefore, at the time of breaking, with the pushing-up of the tip end portion 44b of the breakable coupling portion 44A, the end edge 45a enters the back surface 60b side of the skin layer 60 in a pushing and cutting manner so as to be continuous from the edge angle 44bb on the broken end surface (breaking surface) 44ba side of the tip end portion 44b, the breakage from the breakable portion due to the pushing-up of the tip end portion 44b is easily propagated, and the skin layer 60 can be smoothly broken from the break start point portion 38 along the breakable portion 34.

In the case of the embodiment, further, the breakable coupling portion 44A in the area of the start point portion 38 couples the end edges 45a, 46a on the tip end portion 44b side, in which the width dimension W12 at both the edges 45, 46 in the width direction is reduced, to the edge 42 on the breakable opening 40 side, which is to be coupled, in an acute angle shape in a plan view. Therefore, stress concentration occurs more smoothly on both the end edges 45a, 46a on the tip end portion 44b side where the width dimension W12 of the breakable coupling portion 44A is narrowed, and the breakable coupling portion 44A of the start point portion 38 is easily broken. As a matter of course, with the pushing-up of the tip end portion 44b of the breakable coupling portion 44A, the end edges 45a, 46a on the breakable opening 40 side on both sides extending from the broken tip end portion 44b enter the back surface 60b side of the skin layer 60 in a pushing and cutting manner so as to be continuous from the edge angle 44bb on the broken breaking surface 44ba side of the tip end portion 44b, and therefore, the skin layer 60 can be broken from the break start point portion 38 along the breakable portion 34 more smoothly.

In addition, in the airbag cover 29 of the embodiment, the door portion (first door portion) 31 on the front side is formed in a substantially quadrangular plate shape. The tip end edge 31a on the tip end side at the time of opening, the hinge portion 31c on the rotation center side at the time of opening, and the two side edges 31b, 31b between both ends of the tip end edge 31a and both ends of the hinge portion 31c are disposed around the door portion 31, and the breakable portion 34 is disposed on the tip end edge 31a side and the two side edges 31b sides. The recessed groove 55 recessed from the back surface 30b side toward the front surface 30a side of the base material 30 is disposed in the hinge portion 31c. The breakable opening 40 of the breakable portion 34 and the recessed groove 55 of the hinge portion 31c are shaped at the same time when the base material 30 is molded.

Therefore, in the embodiment, when the base material 30 of the airbag cover 29 is formed by molding, the breakable opening 40 of the breakable portion 34 and the recessed groove 55 of the hinge portion 31c are formed at the same time, and thus the base material 30 can be easily formed. In addition, even if the coupling portion between the end edge 45a on the tip end portion 44b side, where the width dimension W12 of the breakable coupling portion 44A is narrow, and the corresponding edge 42 of the breakable opening 40 is formed in an acute angle shape, the base material 30 can be easily formed as compared with cutting work of an end mill or the like as long as the forming is performed by molding.

Then, in the airbag cover 29 of the embodiment, the second door portion 32, which is opened at the time of inflation, is symmetrically disposed including the side edges 31b, 31b and the hinge portion 31c, with the breakable portion 34 (the horizontal bar portion 35) on the tip end edge 31a side of the door portion 31 interposed therebetween and the breakable portion 34 (the horizontal bar portion 35) on the tip end edge 31a side being shared. The second door portion 32 shares the horizontal bar portion 35 as the breakable portion 34 on the tip end edge 32a side, and the side edges 32b, 32b and the hinge portion 32c are symmetrically disposed with respect to the side edge 31b and the hinge portion 31c of the first door portion 31 with the horizontal bar portion 35 of the breakable portion 34 as a reference.

Therefore, the door portions 31, 32 having a double door type are disposed on the airbag cover 29 of the embodiment. That is, when the airbag 11 is inflated, the horizontal bar portion 35 and the vertical bar portions 36(L, R) of the breakable portion 34 are broken, and the first door portion 31 and the second door portion 32 are pushed and opened around the hinge portions 31c, 32c as the rotation center, such that the first door portion 31 and the second door portion 32 can be opened like a double door, and the protruding opening 65 having a large opening area can be formed.

Further, in the airbag cover 29 of the embodiment, the second door portion 32 is disposed on the rear side of the first door portion 31, and is configured as the airbag cover 29 disposed on the instrument panel 2 in front of the front seat of the vehicle 1.

Therefore, in the embodiment, the airbag cover 29 disposed on the instrument panel 2 is formed by disposing the door portion (first door portion) 31 on the front side and the second door portion 32 on the rear side. Then, when the first door portion 31 and the second door portion 32 are opened with the inflation of the airbag 11, on the tip end edge 31a side of the first door portion 31, the breakable coupling portions 44A, 44B break the tip end portion 44b side having the narrow width dimensions W12, W22, that is, in a state where the breakable coupling portions 44A, 44B are coupled to the first door portion 31 side and the breakable coupling portions 44A, 44B are not coupled to the second door portion 32 side, the first door portion 31 and the second door portion 32 are opened (see the two-dot chain line in FIG. 2), and the second door portion 32 on the rear side close to the occupant is opened in a state where the breakable coupling portions 44A, 44B are not coupled to the tip end edge 32a side at the time of opening. Therefore, even if the second door portion 32 comes into contact with the occupant when the second door portion 32 is opened, the tip end edge 32a side with less unevenness can be brought into contact with the occupant.

In addition, in the airbag cover 29 of the embodiment, as illustrated in FIG. 8, in the vicinity of the break start point portion 38 of the breakable portion 34, the breakable coupling portion 44A in the center portion 35a of the horizontal bar portion 35 of the breakable portion 34 has the intersection angle 9A of about 60° between the end edges 45a, 46a of the tip end portion 44b, which has the narrow width dimension W12, of the side edges 45, 46 and the edge 42 of the breakable opening 40. In the breakable coupling portion 44B away from the start point portion 38, the intersection angle θB is about 75° between the end edges 45a, 46a of the tip end portion 44b, which has the narrow width dimension W22, of the side edges 45, 46 and the edge 42 of the breakable opening 40. Therefore, the degree of the acute angle is increased in the vicinity of the start point portion 38. Therefore, when the airbag 11 is inflated, the vicinity of the center portion 35a in the left-right direction of the horizontal bar portion 35, in which the breakable coupling portion 44A having an increased acute angle of the intersection angle θA is disposed, is broken accurately as the break start point portion 38, and the door portions 31, 32 can smoothly rotate and open the tip end edges 31a, 32a sides around the hinge portions 31c, 32c as the rotation center.

In the embodiment, regarding the intersection angle between the end edges 45a, 46a on the tip end portion 44b side of the breakable coupling portion 44 and the edge 42 of the breakable opening 40, as two types of the intersection angle θA (about 60°) and the intersection angle θB (about 75°), a case in which the small intersection angle θA is disposed at the break start point portion 38 is described. However, as long as the center portion 35a of the horizontal bar portion 35 is configured to be set as the break start point portion 38, the tip end portion 44b of the breakable coupling portion 44 may be disposed such that the entire area of the horizontal bar portion 35 has the same acute intersection angle. In addition, regarding the intersection angles θA, θB between the end edges 45a, 46a on the side edges 45, 46 of the breakable coupling portion 44 and the edge 42 of the breakable opening 40, as long as at least one of the intersection angles θA, θB is an acute angle, the intersection angles θA, θB may not be equal to each other or the other may be an obtuse angle in the vicinity of 90°, and further, as long as the intersection angles θA, θB are acute angles, the intersection angles θA, θB may not be equal to each other.

Figure 9:
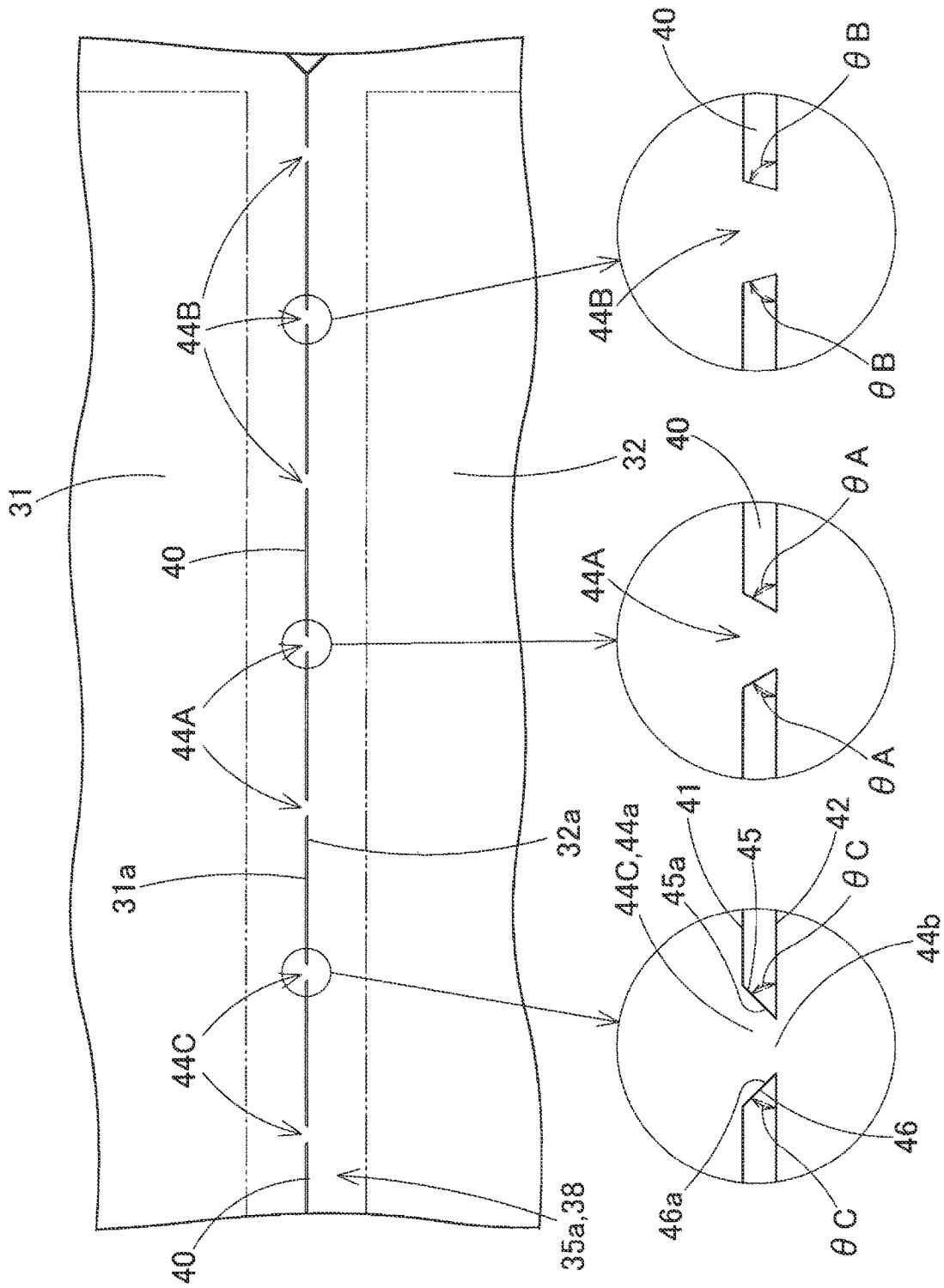
FIG. 9 is a schematic partial enlarged bottom view of an airbag cover illustrating a modification of a breakable portion.

In addition, as in the embodiment, when the acute intersection angle is sequentially increased as a distance from the break start point portion 38 side increases, in addition to the two stages as in the embodiment, as illustrated in FIG. 9, the intersection angle may be set to be increased in three stages by setting an intersection angle θC in the vicinity of the break start point portion 38 to about 45° and sequentially setting the intersection angle θA (about 60°) and the intersection angle θB (about 750), or may be set to be finely divided and sequentially increased.

Figure 11A:
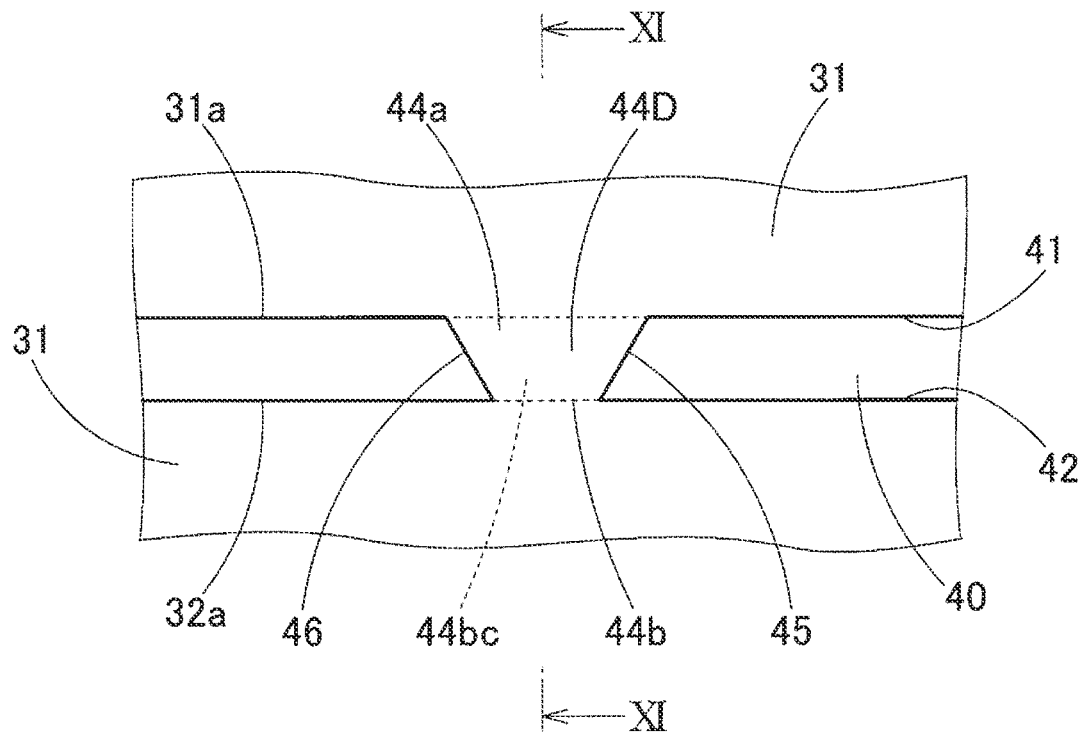
FIG. 11A is a schematic enlarged bottom view illustrating a breakable coupling portion of a modification of a start point portion in the breakable portion according to the embodiment.
Figure 11B:
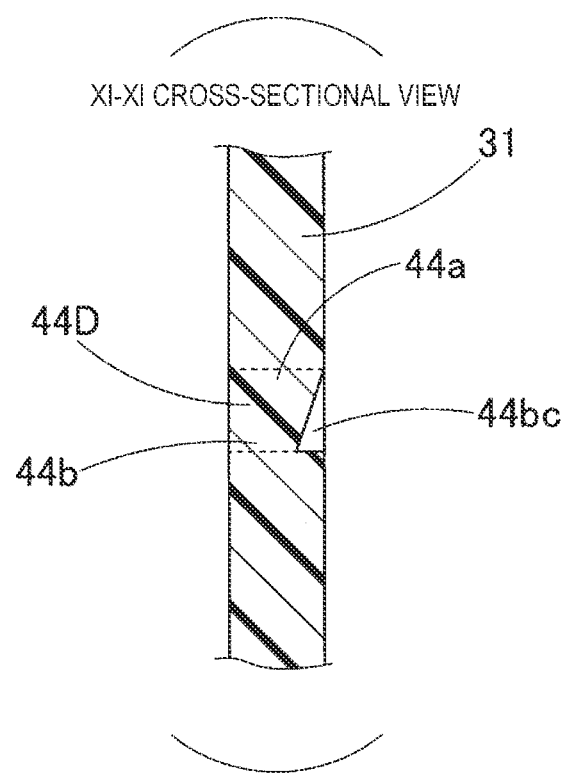
FIG. 11B is a schematic cross-sectional view of the portion.

Further, as the breakable coupling portion, a breakable coupling portion 44D illustrated in FIGS. 11A and 11B includes a notched recess portion 44bc which narrows a cross-sectional area such that the tip end portion 44b side having a narrow width dimension is further broken by stress concentration at the time of inflation of the airbag.

Figure 12A:
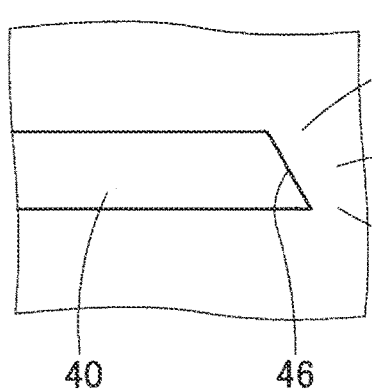
FIGS. 12A to 12D are schematic partial bottom views illustrating various variations of the breakable coupling portion of the breakable portion according to the embodiment.
Figure 12B:
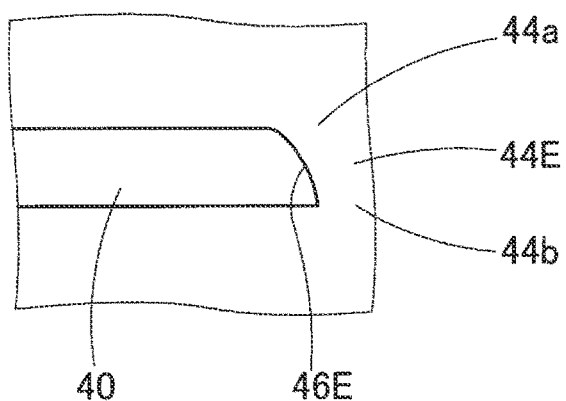
Figure 12C:
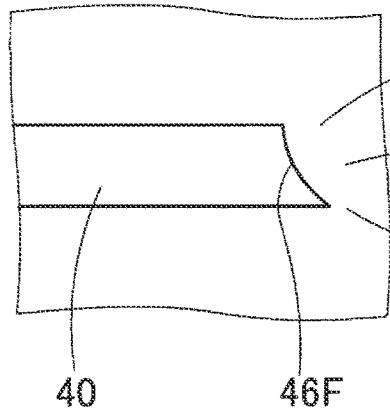
Figure 12D:
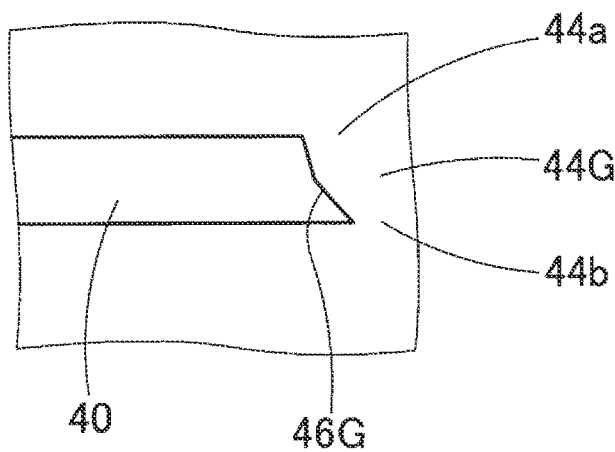

Further, as at least one edge 46 in the width direction of the breakable coupling portion 44, as in the embodiment illustrated in FIG. 12A, in addition to the edge 46 linearly extending to narrow the width dimension from the base portion 44a side toward the tip end portion 44b side, as in a breakable coupling portion 44E illustrated in FIG. 12B, an edge 46E having a recessed shape may be formed to narrow the width dimension from the base portion 44a side toward the tip end portion 44b side. In addition, as in a breakable coupling portion 44F illustrated in FIG. 12C, an edge 46F having a projected shape may be formed to narrow the width dimension from the base portion 44a side toward the tip end portion 44b side. Further, as in a breakable coupling portion 44G illustrated in FIG. 12D, a plurality of linear edges 46G may be formed in which the angle is changed to narrow the width dimension from the base portion 44a side toward the tip end portion 44b side.

In addition, as the breakable coupling portion 48, the base portion 48a on the door portions 31, 32 sides may be made wide and the tip end portion 48b may be made narrow, or the width dimensions of the base portion 48a and the tip end portion 48b may be equal.

Figure 13A:
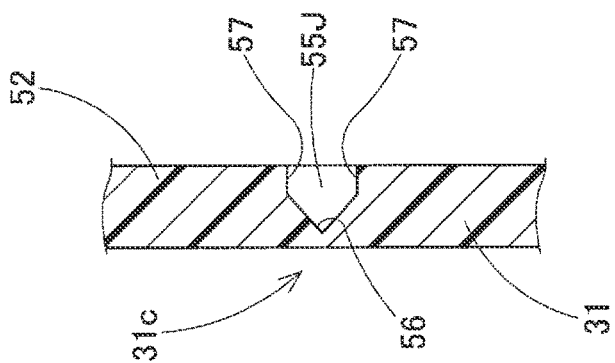
FIGS. 13A to 13D are schematic partial cross-sectional views illustrating various variations of the hinge portion of the door portion according to the embodiment.
Figure 13B:
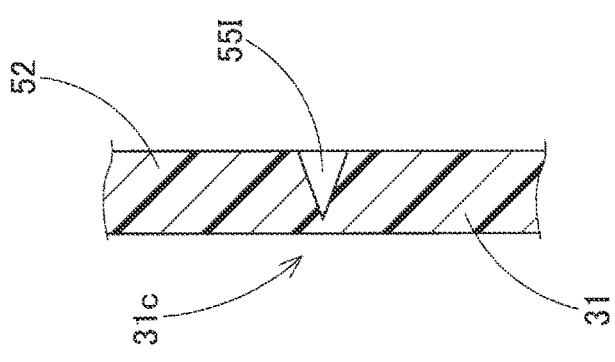
Figure 13C:
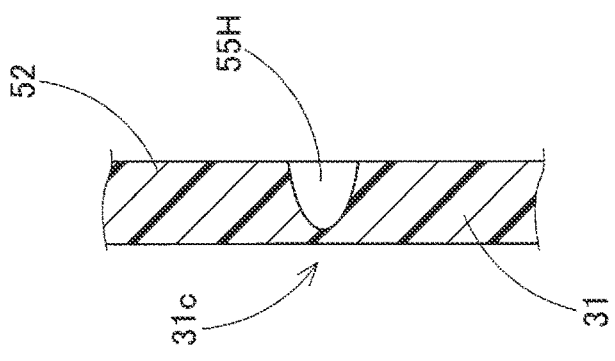
Figure 13D:
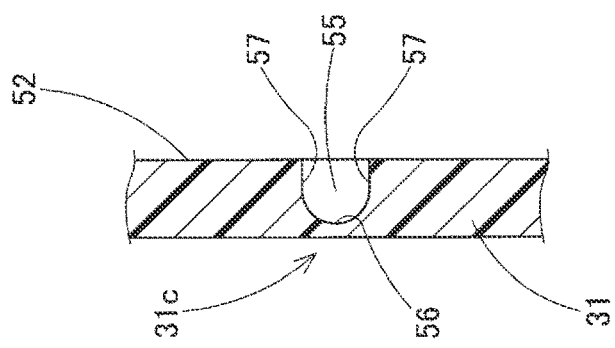

Further, as the hinge portion, it is sufficient that the door portion is smoothly opened, and in addition to the recessed groove 55 having a cross-sectional shape in which the side surfaces 57, 57 parallel to each other are provided from the semicircular arc-shaped bottom surface 56 as in the embodiment illustrated in FIG. 13A, a recessed groove 55H having a cross-sectional shape drawing a parabola as illustrated in FIG. 13B may be formed. In addition, as illustrated in FIG. 13C, a V-shaped groove-like recessed groove 55I may be formed. Further, as illustrated in FIG. 13D, a recessed groove 55J may be formed by providing the side surfaces 57, 57 parallel to each other from the V-shaped groove-like bottom surface 56.

Figure 14:
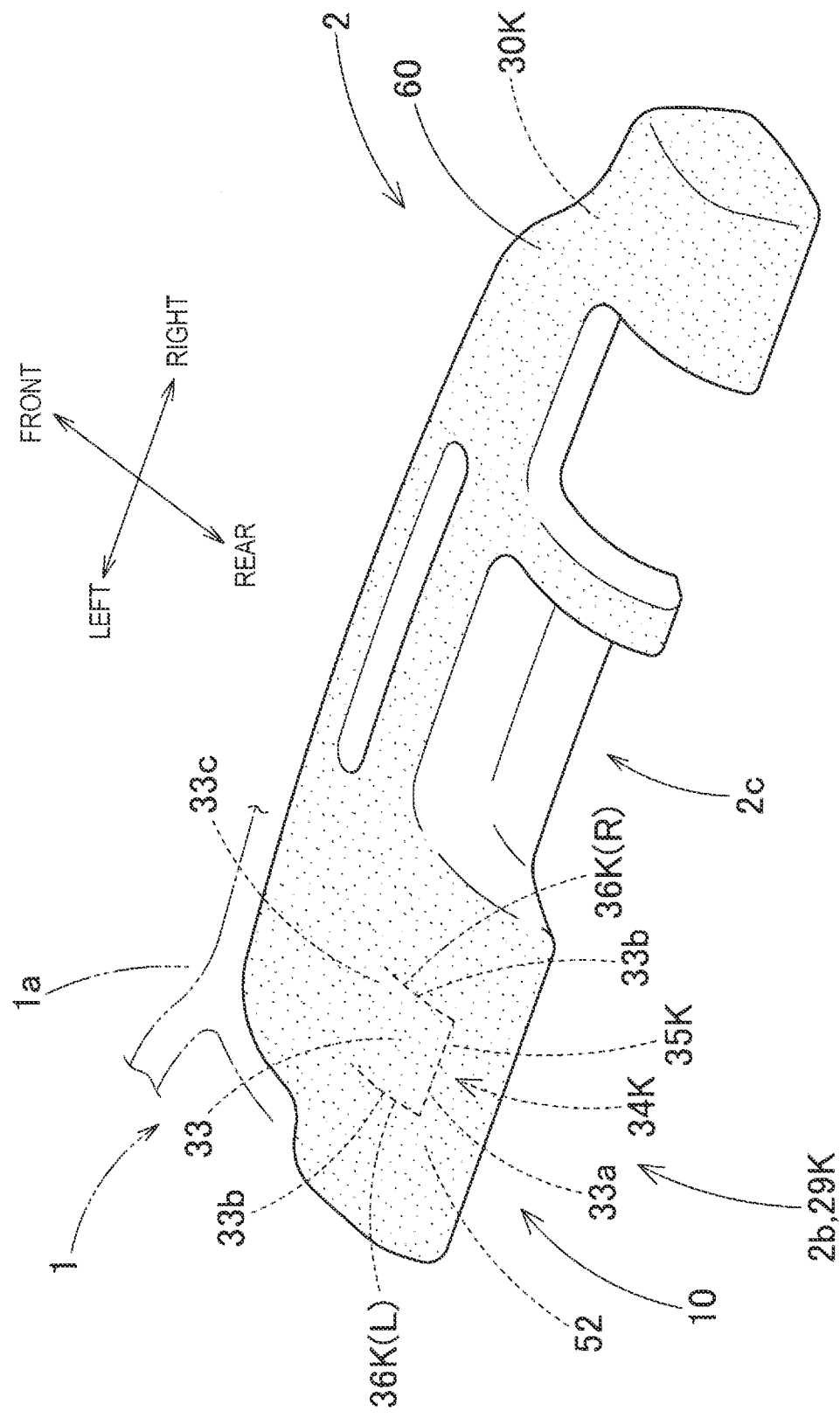
FIG. 14 is a schematic perspective view of an airbag device using an airbag cover according to a modification of the embodiment.
Figure 15:
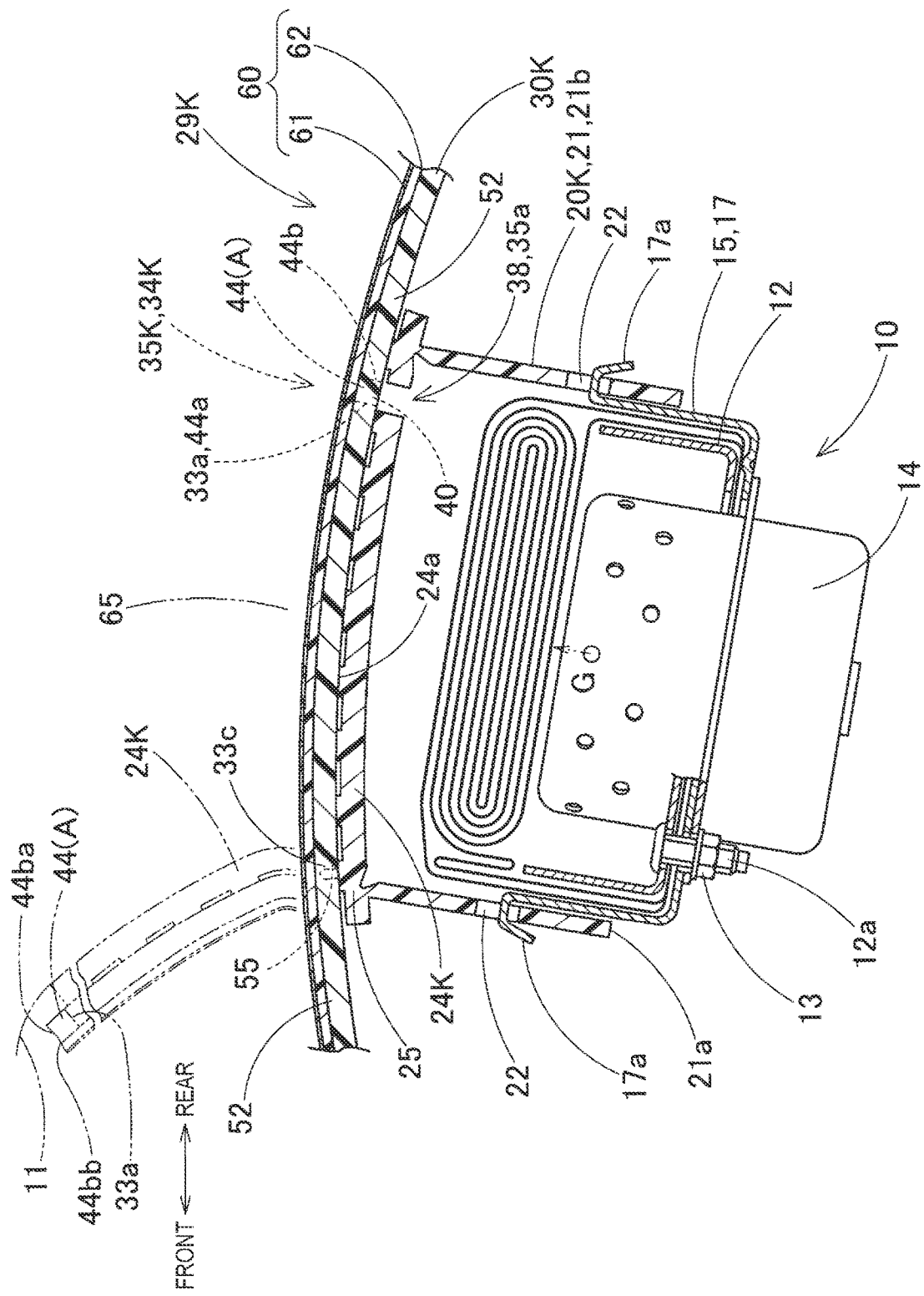
FIG. 15 is a schematic longitudinal cross-sectional view of the airbag device using the airbag cover according to the modification illustrated in FIG. 14.
Figure 16:
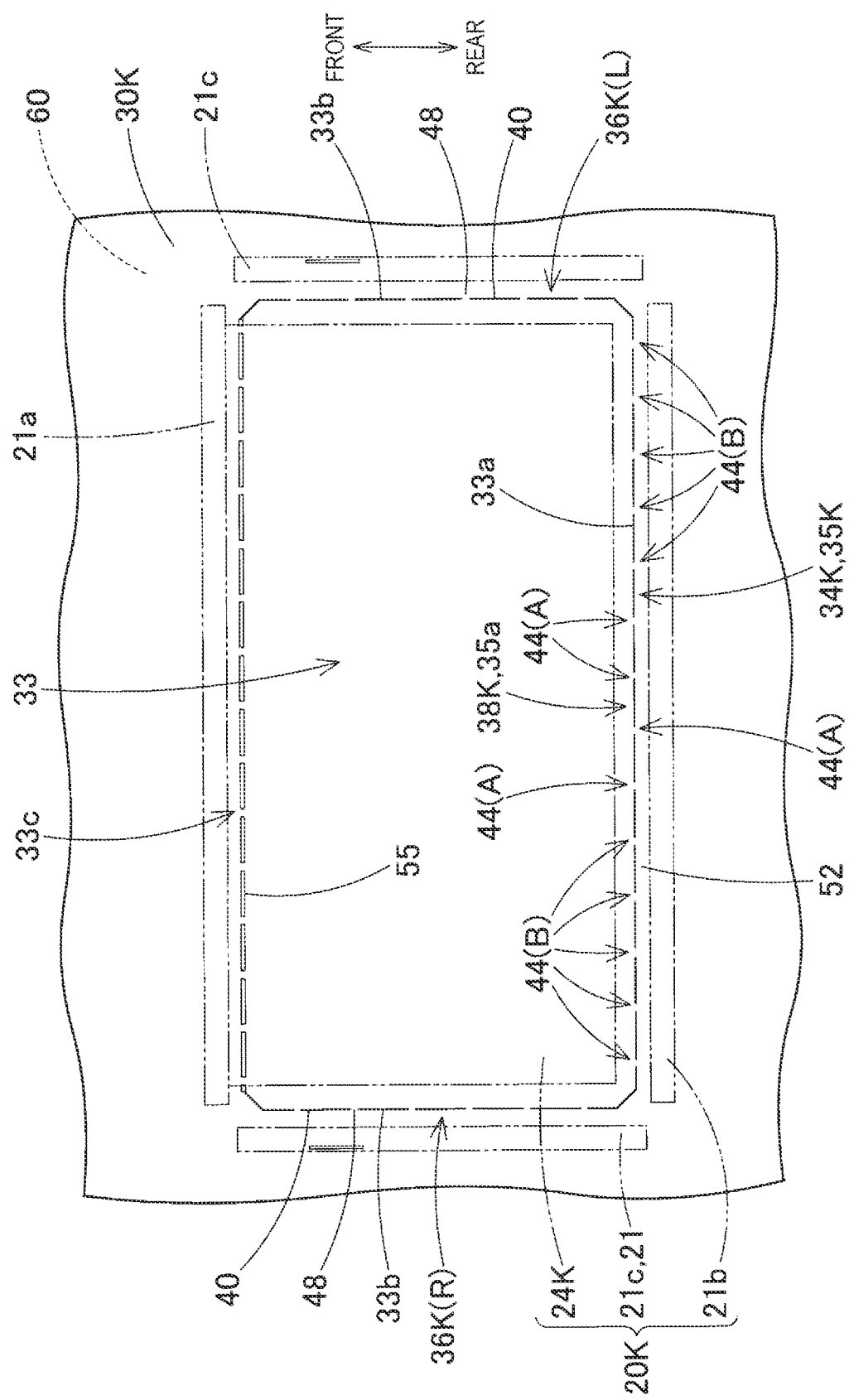
FIG. 16 is a schematic bottom view of the vicinity of a door portion in a base material of the airbag cover illustrated in FIG. 14.

Further, in the embodiment, the airbag cover 29 provided with the door portions 31, 32 having the double door type is disclosed, but as illustrated in FIGS. 14 to 16, an airbag cover 29K provided with a door portion 33 having a single door type may be formed.

The airbag cover 29K is also disposed on the front passenger seat side portion 2b of the instrument panel 2. In addition, an airbag cover 29F includes a base material 30K made of polypropylene or the like formed by injection molding, and the skin layer 60 similar to that of the embodiment bonded to the front surface side of the base material 30K by using an adhesive. Further, at a portion of the airbag cover 29K of the front passenger seat side portion 2b, a door holding portion 24K of a coupling member 20K is welded and coupled to the base material 30K. The coupling member 20K includes the case side portion 21 having a quadrangular tube shape and one door holding portion 24K.

Then, the door portion 33 of the airbag cover 29K has a substantially rectangular shape, a hinge portion 33c is disposed on a rear edge side, a front edge side is a tip end edge 33a which is a tip end at the time of opening, and the door holding portion 24K of the coupling member 20K is welded to a back surface 33d side as side edges 33b extending rearward from both left and right ends of the tip end edge 33a. The thin hinge portion 25 is disposed on the rear edge side of the door holding portion 24K.

The door portion 33 is configured to be opened to form the protruding opening 65 of the airbag 11 by breaking a U-shaped breakable portion 34K around the door portion 33 and further breaking the portion of the skin layer 60 at the peripheral edge of the door portion 33. As a matter of course, similarly to the embodiment, the door portion 33 is configured to couple the door holding portion 24K of the coupling member 20K to the back surface 33d side, and to be opened to form the protruding opening 65 together with the door holding portion 24K.

The breakable portion 34K includes the plurality of strip-shaped breakable openings 40 penetrating the front and back of the base material 30K and disposed along the edge of the door portion 33, and the plurality of breakable coupling portions 44(A, B), 48 disposed to close gaps between the breakable openings 40 and broken when the airbag 11 is inflated. Then, the breakable portion 34K is configured to break, as the break start point portion 38, a portion in the vicinity of a center on the tip end edge 33a side of the door portion 33 away from the hinge portion 33c on a rotation center side of the door portion 33 when the door portion 33 is opened.

The breakable portion 34K includes a horizontal bar portion 35K disposed along the left-right direction with the start point portion 38 disposed at the center portion 35a, and vertical bar portions 36K(L, R) extending from both left and right ends of the horizontal bar portion 35K to the rear of the hinge portion 33c. The breakable coupling portion 44 disposed in the horizontal bar portion 35K is configured such that the breakable coupling portion 44A of the embodiment is disposed in the vicinity of a start point portion 38K, and the breakable coupling portion 44B of the embodiment is disposed on the vertical bar portion 36K side. The breakable coupling portion 48 of the embodiment is disposed in the vertical bar portion 36K. In the breakable coupling portion 44(A, B), the wide base portion 44a is coupled to the tip end edge 33a side of the door portion 33, and the narrow tip end portion 44b is coupled to the general portion 52 side on the rear side of the door portion 33.

Also in the airbag cover 29K, when the airbag 11, which is mounted on the vehicle 1, is inflated, the door portion 33 is pushed by the inflated airbag 11 to break the breakable coupling portion 44A at the break start point portion 38 of the breakable portion 34K. At this time, similarly to the embodiment, while the breakable coupling portion 44A is coupled to the tip end edge 33a of the door portion 33, the edge angle 44bb (see FIG. 7) on the tip end portion 44b side having the narrow width dimension bites into the skin layer 60 like a knife protruding from the tip end edge 33a of the door portion 33, and the skin layer 60 can be smoothly broken. Then, as the door portion 33 of the base material 30K is opened, the skin layer 60 is rapidly broken from the tip end edge 33a side of the door portion 33, and further, the breakage is propagated to the peripheral edge of the door portion 33, such that the protruding opening 65 of the airbag 11 is smoothly formed together with the door portion 33. The same operation and effect as those of the embodiment can be obtained.

The door portion of the airbag cover may be of a four door type, in which the breakable portion has a shape in which both ends of the horizontal bar portion are opened in a Y shape, and the four doors include, for example, two on both front and rear sides of the horizontal bar portion, and two on both left and right sides surrounded by the Y-shaped breakable portions on both sides of the horizontal bar portion. The present invention can be applied to the breakable coupling portion of the breakable portion.

The invention claimed is:

1. An airbag cover configured to cover an upper side of an airbag which is folded, the airbag cover comprising:
    a base material; and
    a skin layer bonded to a front surface side of the base material, wherein:
    when the airbag is inflated, a door portion provided on the base material is pushed by the airbag, which is inflated, to break a breakable portion around the door portion and to break a portion of the skin layer on a peripheral edge of the door portion, and the door portion opens to form a protruding opening of the airbag;
    a back surface side of the door portion is coupled to a door holding portion extending from a case side housing the airbag which is folded, and the door portion is held by the door holding portion to be openable;
    the breakable portion of the base material includes:
        a plurality of breakable openings which are strip-shaped, penetrate the front and back of the base material, and are disposed along an edge of the door portion; and
        a plurality of breakable coupling portions which are disposed to close gaps between the breakable openings and are broken when the airbag is inflated;
    the breakable portion breaks, as a break start point portion, a portion in a vicinity of a center of a tip end side of the door portion away from a hinge portion on a rotation center side of the door portion when the door portion is opened; and
    the breakable coupling portion in an area of the start point portion is disposed such that a width dimension between the breakable openings which are adjacent to each other in a plan view on a tip end portion away from the hinge portion is smaller than a width dimension on a base portion close to the hinge portion of the door portion.

2. The airbag cover according to claim 1, wherein the breakable coupling portion in the area of the break start point portion couples an edge on the tip end portion side, in which a width dimension of at least one of both edges in a width direction is reduced, to an edge on the breakable openings side, which is coupled, in an acute angle shape in the plan view.

3. The airbag cover according to claim 2, wherein the breakable coupling portion in the area of the start point portion respectively couples the edges on the tip end portion side, in which a width dimension at both the edges in the width direction is reduced, to the edge on the breakable opening side, which is coupled, in an acute angle shape in a plan view.

4. The airbag cover according to claim 1, wherein:
    the door portion has a substantially quadrangular plate shape, and a tip end edge on a tip end side at the time of opening, a hinge portion on a rotation center side at the time of opening, and two side edges between both ends of the tip end edge and both ends of the hinge portion are disposed around the door portion;
    the breakable portion is disposed on the tip end edge side and the two side edge sides;

a recessed groove recessed from a back surface side to a front surface side of the base material is disposed in the hinge portion; and the breakable opening of the breakable portion and the recessed groove of the hinge portion are shaped at the same time when the base material is molded.

5. The airbag cover according to claim 4, wherein a second door portion, which is opened at the time of inflation, is symmetrically disposed including the side edges and the hinge portion, with the breakable portion on the tip end edge side of the door portion interposed therebetween and the breakable portion on the tip end edge side being shared.

6. The airbag cover according to claim 5, wherein the second door portion is disposed on a rear side of the door portion and is disposed on an instrument panel in front of a front seat of a vehicle.

* * * * *